(12) United States Patent
Moldenhauer et al.

(10) Patent No.: US 12,630,124 B2
(45) Date of Patent: May 19, 2026

(54) VEHICLE TREATMENT SYSTEM WITH POSITIONAL STATUS DETECTION MECHANISM

(71) Applicant: PDQ Manufacturing Inc., De Pere, WI (US)

(72) Inventors: Daniel Ervin Moldenhauer, Hubertus, WI (US); Kimmo Antero Ukkola, De Pere, WI (US)

(73) Assignee: PDQ Manufacturing Inc., De Pere, WI (US)

( * ) Notice: Subject to any disclaimer, the term of this patent is extended or adjusted under 35 U.S.C. 154(b) by 267 days.

(21) Appl. No.: 18/611,807

(22) Filed: Mar. 21, 2024

(65) Prior Publication Data

US 2024/0317189 A1 Sep. 26, 2024

Related U.S. Application Data

(60) Provisional application No. 63/454,427, filed on Mar. 24, 2023.

(51) Int. Cl.
| | |
|---|---|
| *B60S 3/04* | (2006.01) |
| *B08B 3/02* | (2006.01) |
| *B08B 13/00* | (2006.01) |
| *F21S 4/00* | (2016.01) |
| *G05D 3/12* | (2006.01) |
| *F21Y 103/10* | (2016.01) |

(Continued)

(52) U.S. Cl.
CPC ................ *B60S 3/04* (2013.01); *B08B 3/024* (2013.01); *B08B 13/00* (2013.01); *F21S 4/00* (2013.01); *G05D 3/125* (2013.01); *F21Y*

*2103/10* (2016.08); *F21Y 2113/00* (2013.01); *F21Y 2115/10* (2016.08); *G08B 5/36* (2013.01)

(58) Field of Classification Search
CPC .... B60S 3/04; F21S 4/00; B08B 13/00; B08B 3/024; G05D 3/125; F21Y 2113/00; F21Y 2103/10; F21Y 2115/10; G08B 5/36
See application file for complete search history.

(56) References Cited

U.S. PATENT DOCUMENTS

| | | | |
|---|---|---|---|
| 4,981,523 A | * | 1/1991 | Larson ...................... B60S 3/04 |
| | | | 134/45 |
| 9,862,359 B2 | | 1/2018 | Belanger et al. |

(Continued)

FOREIGN PATENT DOCUMENTS

| | | | |
|---|---|---|---|
| CA | 2446330 C | 9/2007 | |
| CN | 116424273 A | * 7/2023 | ........... G05D 1/0278 |

(Continued)

*Primary Examiner* — Benjamin L Osterhout
(74) *Attorney, Agent, or Firm* — Dickinson Wright PLLC

(57) ABSTRACT

A system for detecting a positional status of a vehicle treatment device is provided. The vehicle treatment device is rotatable relative to a support structure. A plurality of proximity sensors are disposed on the support structure. A flag is rotationally fixed to the treatment device and is configured to activate at least one of the sensors during a predetermined movement to determine orientation. In response to a deviation, external force, or impact on the treatment device, the flag pivots or moves relative to the support structure and sensors in an unexpected manner, causing a deviation from an expected activation of the sensors according to the predetermined movement.

23 Claims, 21 Drawing Sheets

(51) Int. Cl.
| | |
|---|---|
| *F21Y 113/00* | (2016.01) |
| *F21Y 115/10* | (2016.01) |
| *G08B 5/36* | (2006.01) |

(56) References Cited

U.S. PATENT DOCUMENTS

| | | | | |
|---|---|---|---|---|
| 10,266,155 | B2 | 4/2019 | Detrick | |
| 2002/0162575 | A1* | 11/2002 | Fratello | B60S 3/04 |
| | | | | 134/123 |
| 2004/0221878 | A1* | 11/2004 | Johnson | B60S 3/04 |
| | | | | 134/123 |
| 2006/0027253 | A1 | 2/2006 | Kaiser | |
| 2006/0065292 | A1* | 3/2006 | Moore | B60S 3/04 |
| | | | | 134/29 |
| 2009/0272409 | A1* | 11/2009 | Petit | B05B 3/14 |
| | | | | 239/548 |
| 2011/0277797 | A1 | 11/2011 | Turner et al. | |

FOREIGN PATENT DOCUMENTS

| | | | | | |
|---|---|---|---|---|---|
| EP | 0947405 | A2 | * | 10/1999 | B60S 3/06 |
| EP | 1090235 | B1 | * | 6/2002 | B60S 3/04 |
| JP | 2021172168 | A | * | 11/2021 | |
| WO | 0185505 | A1 | | 11/2001 | |

* cited by examiner

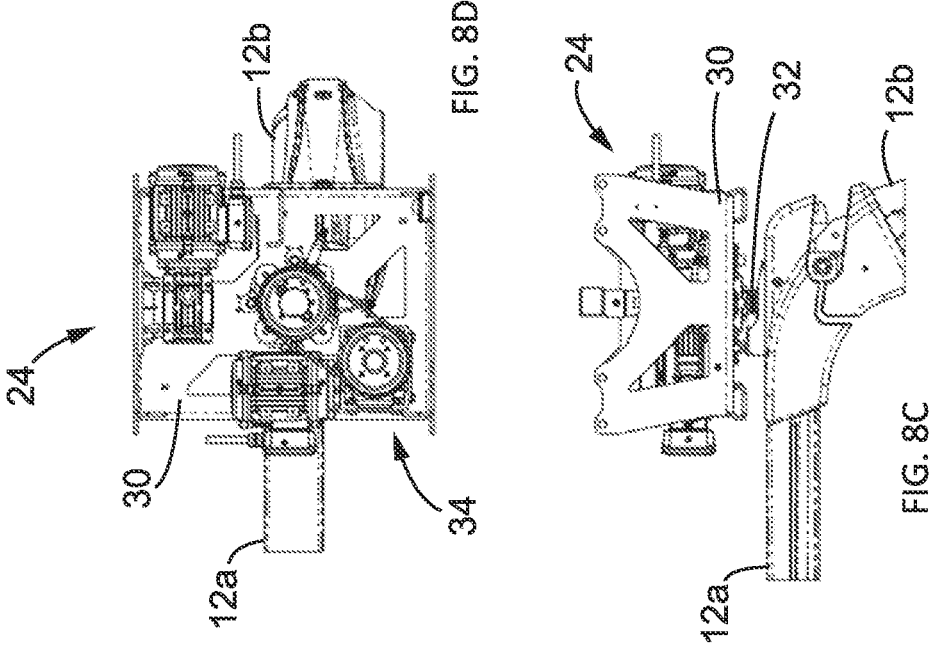
FIG. 8D
FIG. 8C
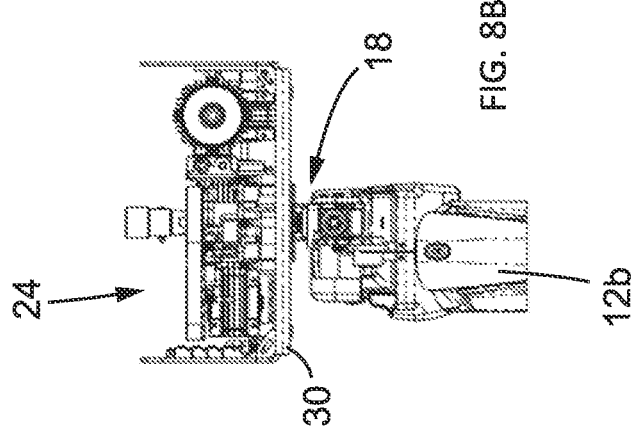
FIG. 8B

PURPLE

42

GREEN

10

26

GREEN

12

61

59 59

40

22

GREEN

ORANGE

42

GREEN

10

26

GREEN

12

61

59 59

40

22

GREEN

VEHICLE TREATMENT SYSTEM WITH POSITIONAL STATUS DETECTION MECHANISM

FIELD

The present disclosure relates to vehicle treatment systems. More particularly, the present disclosure relates to a system for detecting a positional status for automated vehicle treatment systems, such as automated car washes.

BACKGROUND

Current vehicle treatment systems are in use today to provide various vehicle treatment aspects, including but not limited to vehicle washing devices and vehicle drying devices. Such systems may be fluid-based which are typically considered a "touchfree" system in which fluids (water, soap, chemical) and air are used to clean. Other systems may be friction wash systems, which use rotating brushes, hanging cloth, fabric, foam, etc., or other physical media that touches the vehicle surface, and also include a combination of fluids, such as water, soap, and/or chemicals.

These various vehicle treatment systems can be used both in conveyor type systems, in which the vehicle is conveyed through a vehicle treatment facility, or stationary systems, in which the vehicle remains stationary and the vehicle treatment devices move relative to the generally stationary vehicle. Combination systems in which the vehicle is conveyed during treatment and also treated while remaining stationary are also possible.

During vehicle treatment processes a treatment device, such as a spray arch or elongated member (such as an application manifold member, which may be straight, curved, or other shape) for providing pressurized fluid to the vehicle surface via nozzles or other fluid outlets, will move relative to the vehicle to treat the various exterior surfaces of the vehicle, including the front/rear bumpers, side panels, roof, wheels, and the like. The vehicle treatment device, during this movement, may rotate or move in linear translation in order to direct the fluid outlets toward the desired exterior surface of the vehicle at a correct optimal distance.

The rotation of the treatment device may be provided by a rotatable shaft supported by a bearing element, with treatment fluid conveyed through the center of the shaft. Fluid flows generally through the shaft and into the downstream portions of the treatment device, which may include a generally horizontal upper arm and/or a generally vertical side arm. The treatment device may be only a generally vertical member or may be only a generally horizontal member, which may move up and down, fore-and-aft, and/or rotate.

While rotation of the device is generally not limited by the provision of fluid, other non-fluid connections to the treatment device cause physical limitations on the amount that the device can rotate. For example, power and communication wires/cabling extending along the treatment device can be provided with a small amount of slack to allow limited rotation. However, continuous rotation of the device will cause such wires and cables to wrap around the device as it rotates, thereby causing the device to lock up or otherwise be prevented from rotating to the desired position. Moreover, the provision of slack in the wire to allow for limited rotation leads to exposed and/or dangling cable/wires that are susceptible to damage. Accordingly, while some rotation of the treatment device having cables or wires is possible, the rotation is limited.

One example of an additional control element is a strip of lights that may be added to the arms of the treatment device. However, the control of the lights is limited to controlling the strip of lights off and on to provide the single color of the strip of lights. Providing specifically controlled sections or different colors would require additional wires for each section and additional color, which can ultimately be too cumbersome to implement for rotational devices.

Another aspect of vehicle treatment systems includes the detection of an impact between the vehicle and the vehicle treatment device. During a vehicle treatment operation, the vehicle may be directed to a desired central location relative to the vehicle treatment device. However, whether due to an error in placement of the vehicle by the operator or an error in the detection of the vehicle surfaces by the treatment system, the moveable vehicle treatment device may unintentionally come into contact with the vehicle. The device may also unintentionally make contact with a person or other obstacle during a treatment operation.

In response to impact, vehicle treatment systems may be configured to stop operating or otherwise alter the operation to minimize negative effects of the undesired impact. To provide this modification of the control, the system first receives a signal indicating that the impact has occurred. One type of impact sensing system includes the use of multiple moving mechanical parts, many of which have tight tolerances, which can lead to high cost and unreliability if tolerances and quality is not met. Sensors and associated structure are typically disposed within a trolley frame that includes the motor controlling the position of the treatment device as well as other control components. Prior impact detection structure requires multiple moving components with tight tolerances, where issue with any of those can result in an impact not being detected.

In addition to impact detection, rotational orientation detection of the treatment device may be performed by the use of a single analog distance sensor relative to a complicated machined flag member having a specified sloped surface. Based on the rotational position, the sloped surface is at a varying distance from the sensor, with the distance being measured relative to the sloped surface. However, the sloped surface is expensive and difficult to machine, and also takes up a substantial amount of space within the control housing, along with the corresponding expensive sensor that relies on a precise quantitative distance measurement.

Thus, both the orientation sensor and mechanical components, combined with the impact sensing components, take up a substantial amount of space and are subject to errors due to associated tolerances. Due to space constraints, the use of these sensing systems limits the ability to make improvements to other mechanical and electrical control components of the vehicle treatment system.

Accordingly, improvements can be made to such vehicle treatment systems.

SUMMARY

In one aspect of the present disclosure, a vehicle treatment system for detecting a positional status of a vehicle treatment device includes: a rotatable vehicle treatment device supported for rotation by a support structure and having an axis of rotation; a bracket including a flag attached thereto, the bracket rotationally fixed relative to the vehicle treatment device, wherein the bracket and flag rotate with the vehicle treatment device; wherein the bracket and flag are pivotable about a pivot axis of the bracket aligned transverse to the axis of rotation of the vehicle treatment device in response to a deviation of the treatment device from an expected position; and a plurality of sensors fixed relative to the support structure, wherein the bracket, flag, and treatment device are rotatable relative to the plurality of sensors; wherein the flag is detected by at least one sensor during predetermined movement of the vehicle treatment device; wherein the flag moves relative to the sensors during a deviation from an expected angular position of the predetermined movement by the vehicle treatment device, such that a different number of sensors detect the flag relative to an expected number of sensors for the predetermined movement.

In one aspect, the sensors are equally spaced surrounding the shaft, and the flag has a length such that either one or two sensors can be activated simultaneously during normal operation depending on the rotational position. In one aspect, the vehicle treatment device tilts when an external force is applied and causes a bracket carrying the flag to pivot, causing the flag to move relative to the sensors.

In another aspect, a method of detecting a positional status of a vehicle treatment device of a vehicle treatment system is provided, the method including the steps of: providing a rotatable vehicle treatment device, wherein the vehicle treatment device is rotatable relative to a support structure, wherein a bracket and flag rotate with the vehicle treatment device, and wherein a plurality of sensors are fixed relative to the support structure; detecting the flag by at least one of the sensors; providing an external force on the vehicle treatment device and pivoting the vehicle treatment device relative to at least one pivot axis of the vehicle treatment device; contacting the bracket with the vehicle treatment device in response to pivoting the vehicle treatment device, and thereby pivoting the bracket about a pivot axis of the bracket; moving the flag fixed to the bracket away from the sensors in response to pivoting the bracket about the pivot axis of the bracket; detecting, by the sensors, that the flag has moved away from the sensors and detecting a deviation from a predetermined movement of the vehicle treatment device.

In yet another aspect, a vehicle treatment system for detecting a positional status of a vehicle treatment device is provided, the system including: a rotatable vehicle treatment device supported for rotation by a support structure and having an axis of rotation; a flag that rotates with the vehicle treatment device; and a plurality of sensors fixed relative to the support structure, wherein the flag moves relative to the plurality of sensors and activates the sensors based on the rotational position of the flag relative to the sensors; wherein rotational speed, position, and orientation of the vehicle treatment device are determinable based on which sensors of the plurality of sensors are activated by the flag; wherein a deviation from a predetermined movement of the vehicle treatment device is detectable in response to an activation of sensors that deviates from an expected activation according to the predetermined movement of the vehicle treatment device.

These and other aspects will be described in more detail below and with reference to the drawings.

BRIEF DESCRIPTION OF THE DRAWINGS

FIG. 7 is a bottom perspective view of the vehicle treatment device supported by the trolley under the wash bridge;

FIGS. 8A-8D illustrate multiple views of the trolley and vehicle treatment device, with the covers of the trolley removed from view;

DETAILED DESCRIPTION

Figure 1:
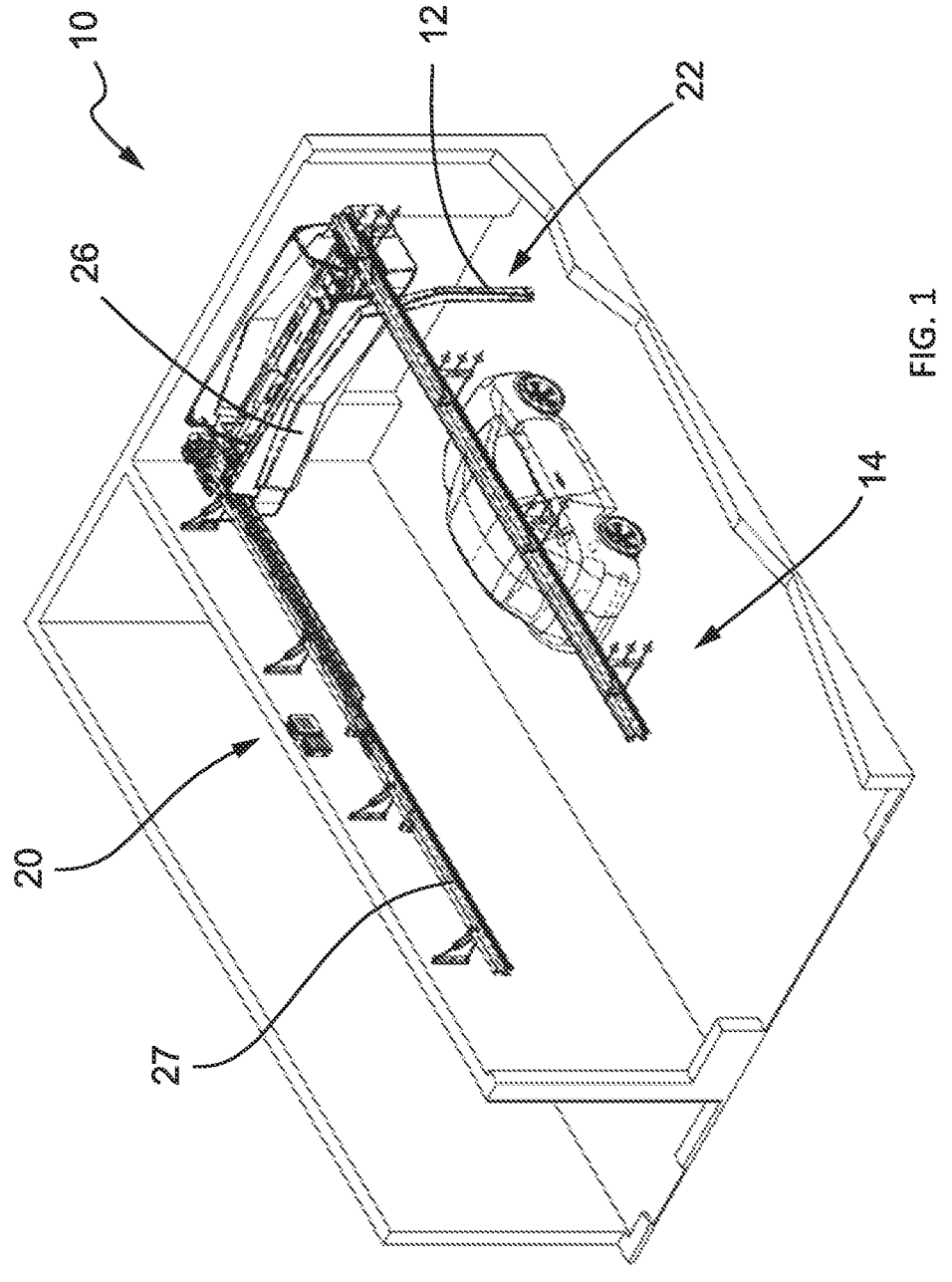
FIG. 1 is a perspective view of a smart vehicle treatment system, including a rotatable vehicle treatment device rotatably mounted for complex movement to a trolley supported on a wash bridge and frame.
Figure 2:
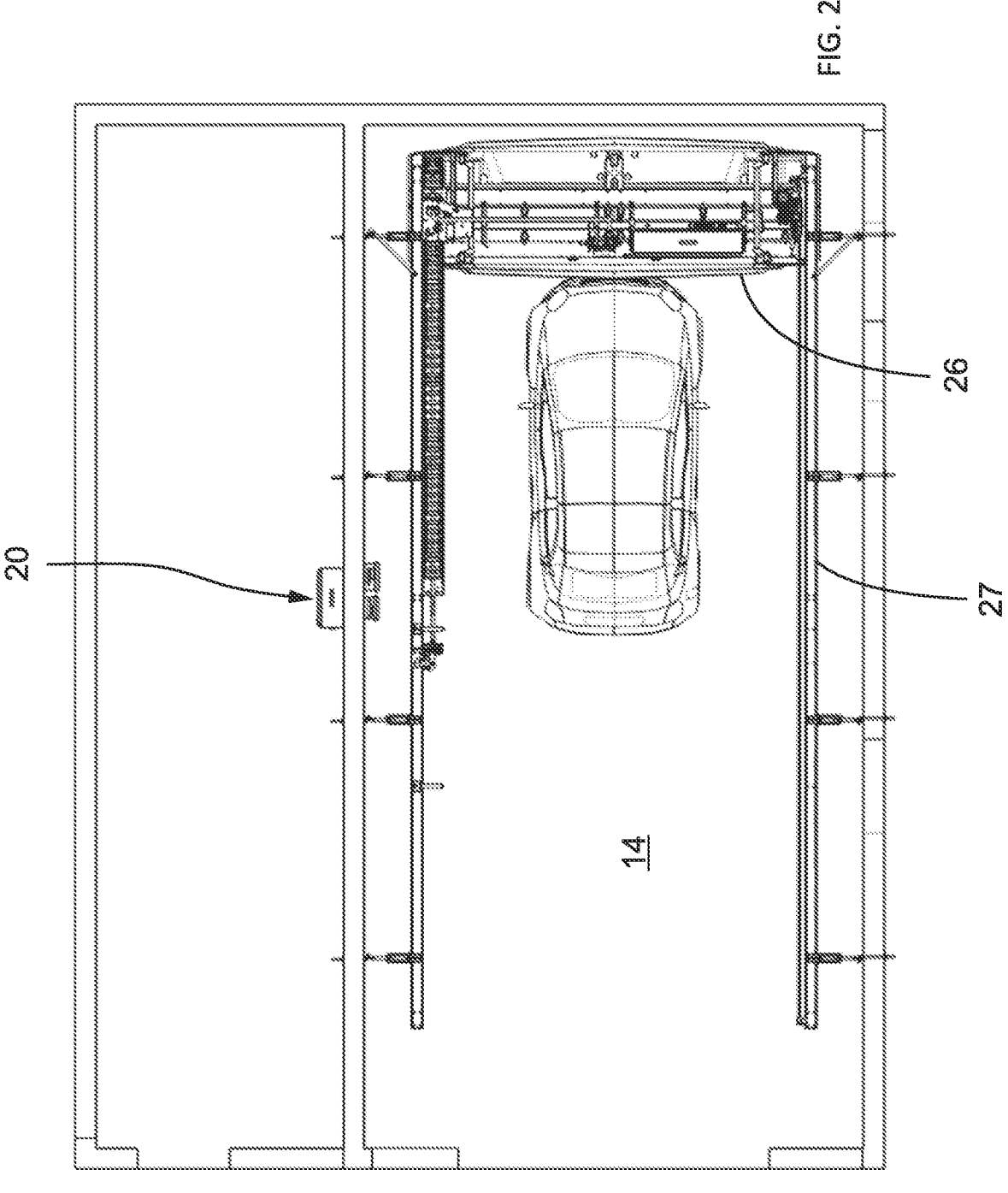
FIG. 2 is a top view of the smart vehicle treatment system.
Figure 4:
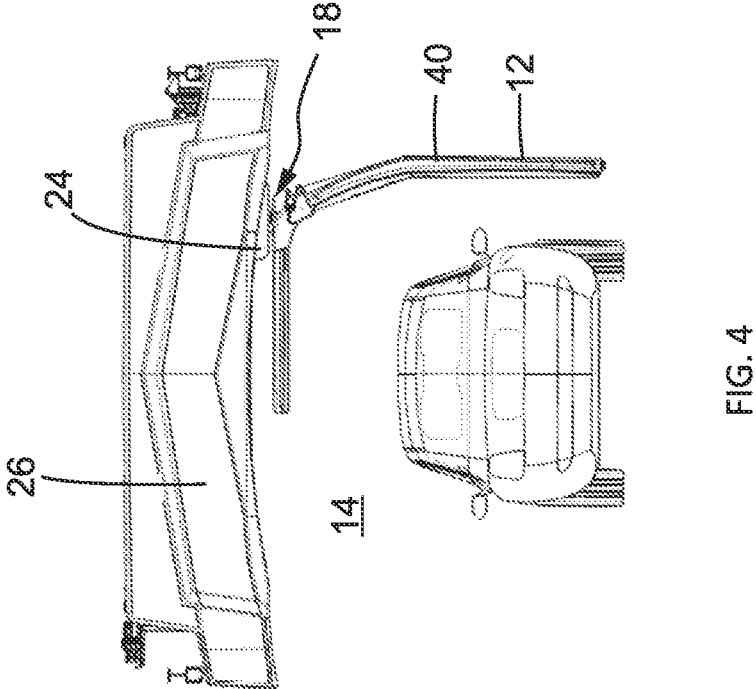
FIGS. 3-6 illustrates the vehicle treatment device in various positions relative to a vehicle in a vehicle treatment area.
Figure 3:
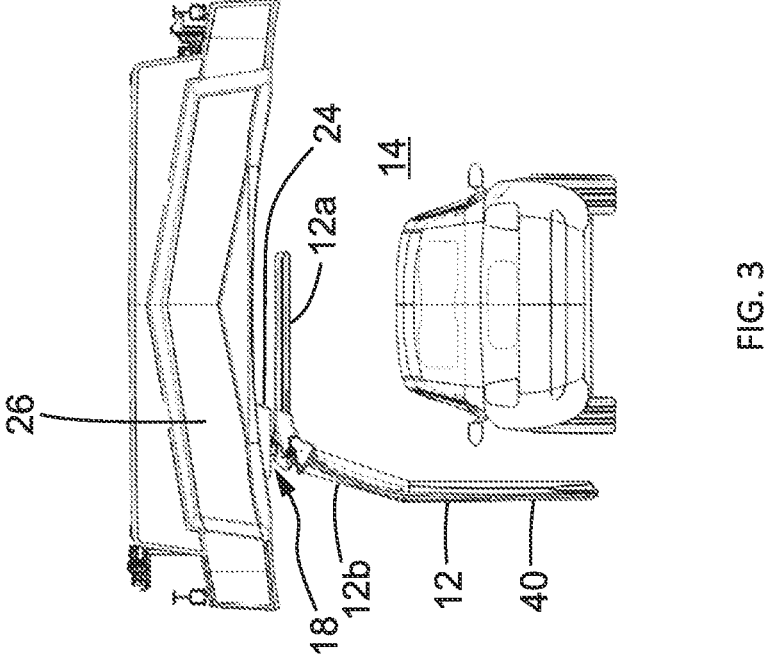
Figures 5, 6:
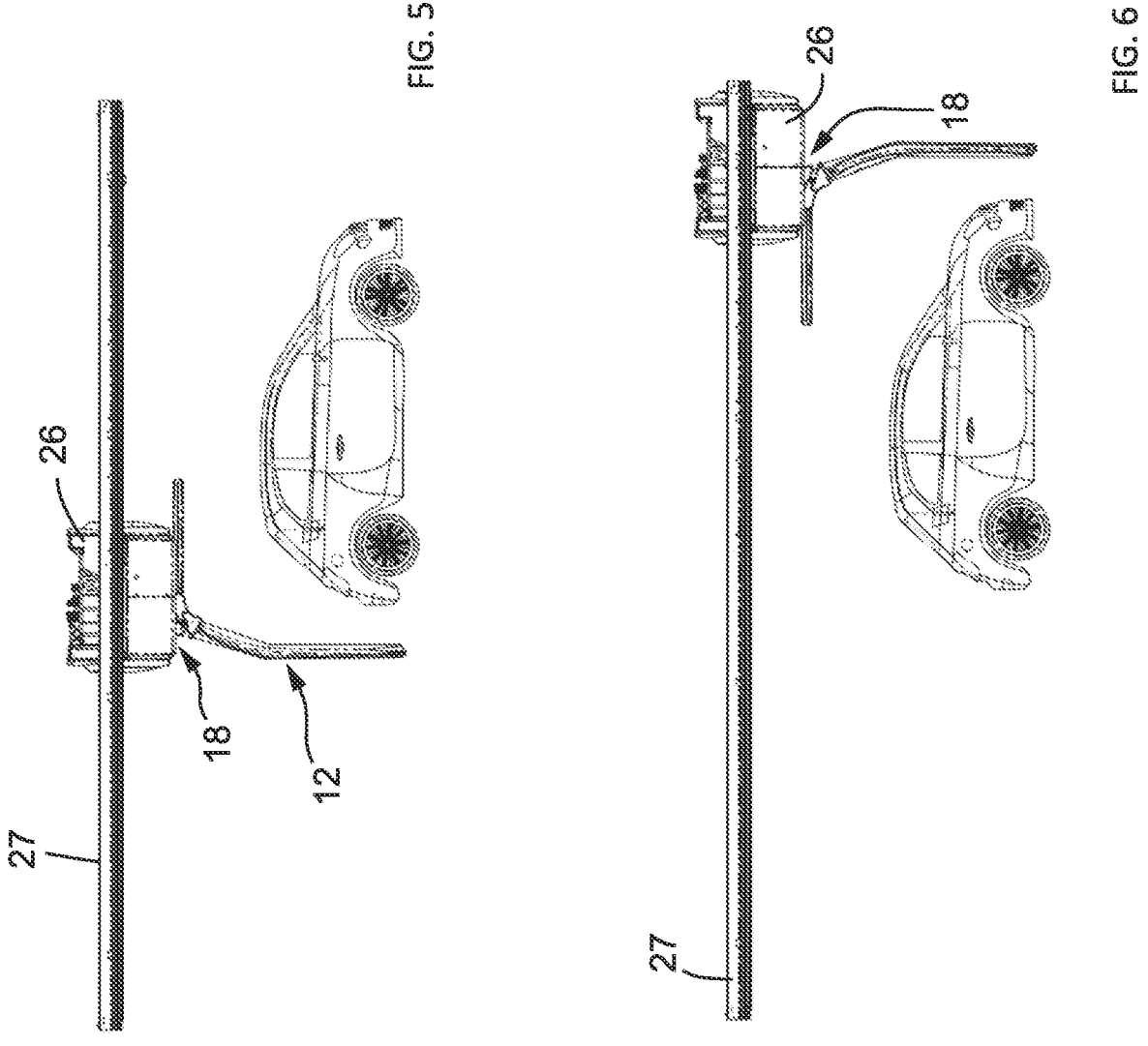

With initial reference to FIGS. 1-7, a vehicle treatment system 10 having a vehicle treatment device 12 supported for translation and rotation relative to a vehicle treatment area 14 is provided. The vehicle treatment device 12 is shown in the form of a spray arch, but may also be in the form of other treatment devices, such as rotatable brushes or the like. For the purposes of discussion and illustration, the illustrated spray arch and its functionality will be shown and referenced herein, but it will be appreciated that the various aspects discussed herein are also applicable to these other various treatment devices, such as brushes or the like.

The treatment device 12 is capable of full rotation and complicated rotation schemes (combined rotation and/or translation along multiple degrees of freedom) via a rotational connection 18, and is further configured for smart control, in which its rotational and directional positon, and treatment schemes, may be operated by multiple controllers, with specific activatable operation schemes provided via the same treatment device 12. For instance, as described throughout the specification, the treatment device 12 can include a plurality of various illumination states, with various colors illuminated, various quantities of lights illuminated, various intensity of illumination, and the like.

Additionally, various controllable treatment schemes may be activated. For example, various controllable valves may be operated and controlled to provide treatment at select areas of the treatment device 12 while other sections of the treatment device 12 are not activated.

Smart control of the vehicle treatment device 12 may be provided by the combination of a main controller 20 and a sub-controller 22 in communication with the main controller 20. The sub-controller 22 (which may be in the form of multiple sub-controllers 22) is provided directly on the treatment device 12, with the main controller 20 provided remote from the treatment device 12 "upstream" from a movement mechanism that provides multiple degrees of freedom. The movement mechanism of the present disclosure includes the rotational connection 18 of the treatment device 12, as described in further detail below, and may also include trolley 24 (which moves laterally side-to-side) and wash bridge 26 (which moves fore-and-aft), described in further detail below. It will be appreciated that other movement mechanisms and combinations may be used to provide movement along multiple degrees of freedom, including linear and/or rotational movement With the sub-controller 22 provided on the treatment device, and receiving multiplexed communication from the main controller 20, the number of wire conductors or connections for electrical communication between the main controller 20 and the sub-controller 22 passing through the movement mechanism and the rotational connection 18 can be reduced, with increased communication and control provided via the various outputs of the "downstream" sub-controllers 22, thereby providing for an ability to increase the overall amount of electrical communication while decreasing the number of physical connections and using a multiplexed communication method.

Figures 7, 8A:
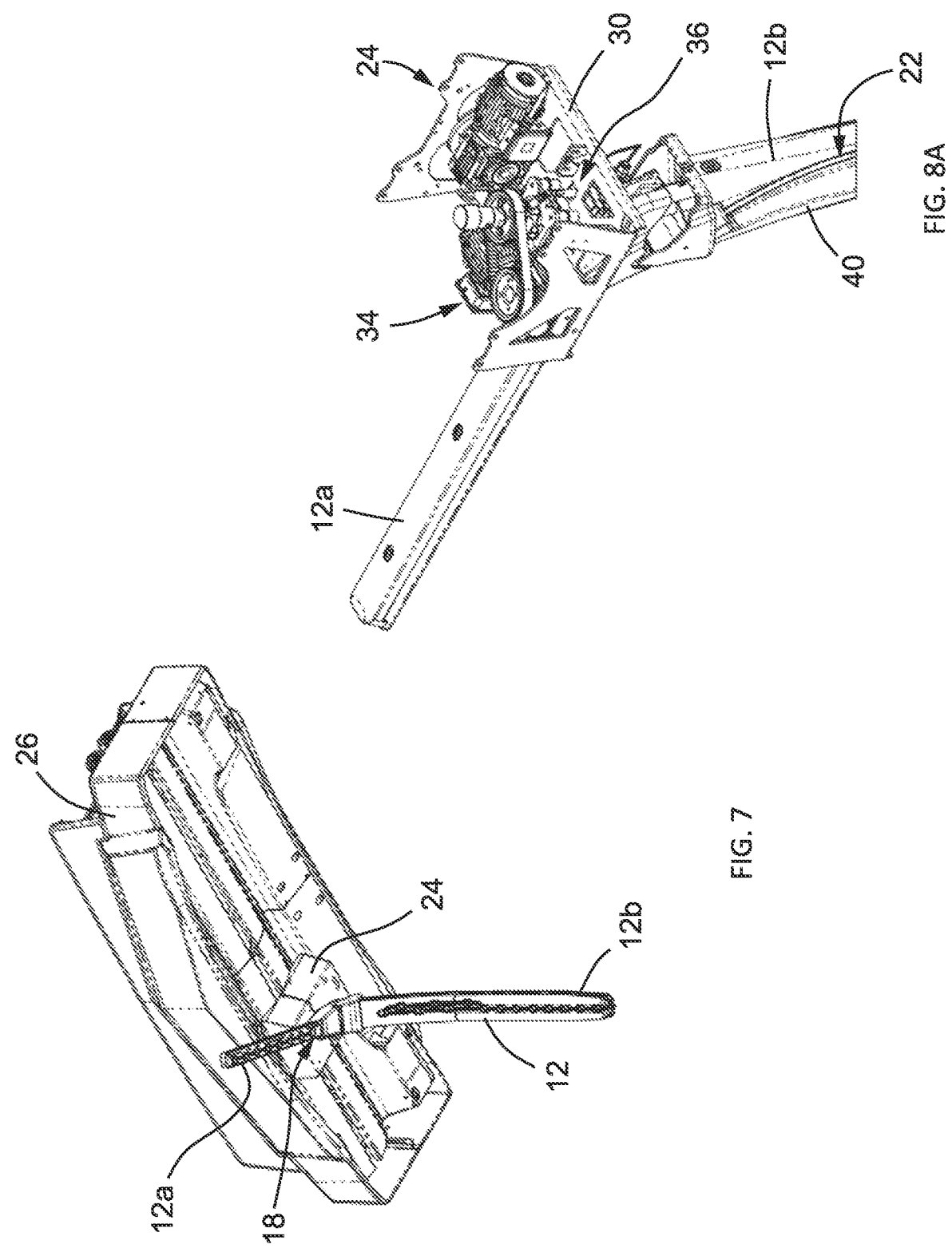
Figures 9A, 9B:
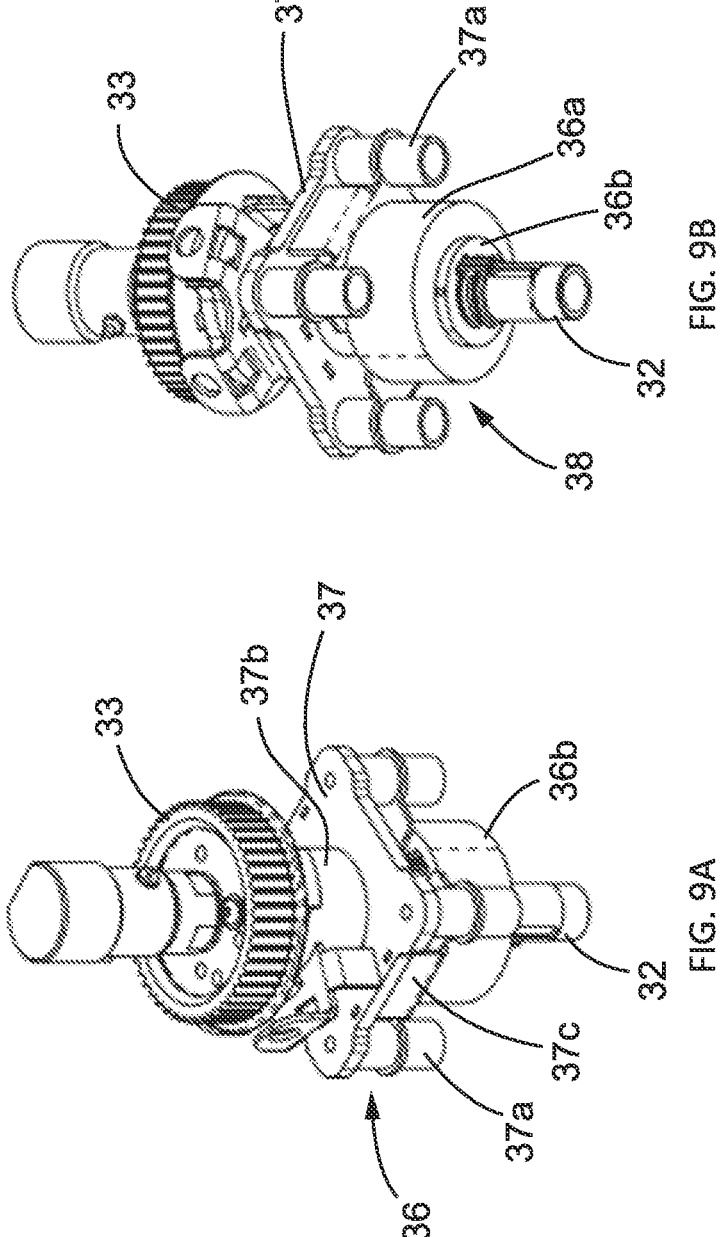
FIGS. 9A-9G are top and bottom perspective views, top, front, and side views, and exploded views of an arch rotatable shaft, its support bearing structure, rotating drive element, and slip ring device.
Figures 9C, 9D, 9E:
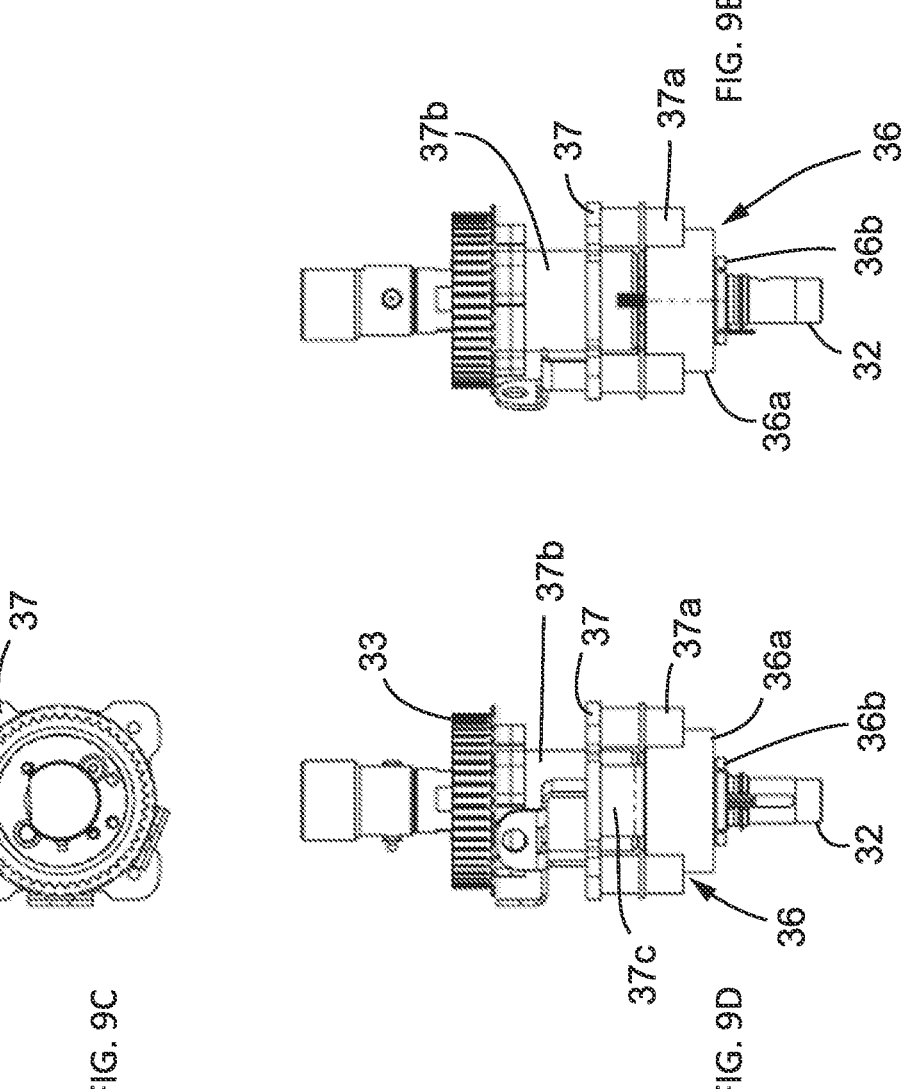
Figure 9G:
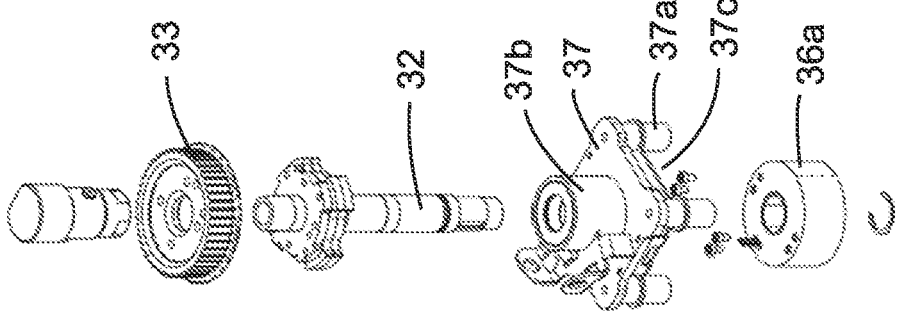
Figure 9F:
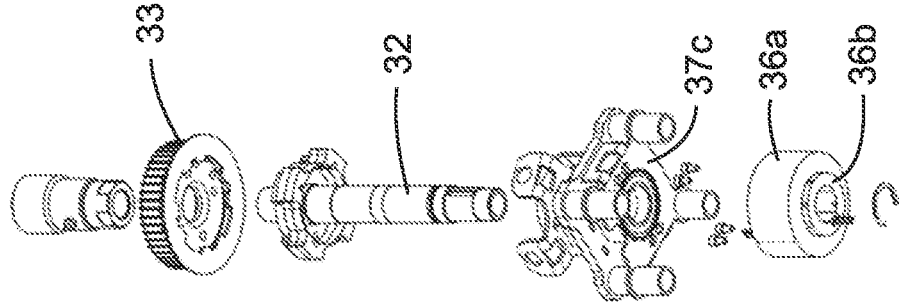

With reference to FIG. 7, the treatment device 12 is rotatably supported via a rotational connection 18 between the treatment device 12 and a trolley 24. Trolley 24, in one approach, is translatable along a wash bridge 26, which extends laterally across the vehicle treatment area 14. The wash bridge 26 may be translatable in a fore-and-aft direction and supported by a frame 27 that extends in the fore-and-aft direction (which may include ground-engaging supports or be fixed to the walls or ceiling of a vehicle treatment facility). It will be appreciated that the wash bridge 26 may also be made stationary, and may itself have ground/wall/ceiling engaging support, and the vehicle may be conveyed relative to wash bridge 26, with lateral motion provided by the trolley 24 along the wash bridge 26 along with possible rotation of the treatment device 12, thereby having dynamic/complicated motion along multiple degrees of freedom. It will be appreciated that reference made to the wash bridge is applicable to various types of structure with different types of support, including both stationary and moveable structure, and may also be referred to as a gantry or primary support structure. It will be appreciated that the reference to dynamic/complicated motion or movement is intended to encompass movement along more than one degree of freedom for linear and/or rotational movement. This general scheme for lateral and longitudinal positioning of the treatment device 12 via a bridge-supported trolley is known and detailed discussion of such linear positioning schemes are not necessary. As shown here, the treatment device 12 can be moved in two transverse linear directions, in addition to being rotated. But it will also be appreciated that movement could be in one linear direction with rotational movement, or in two linear directions, or vertically with rotation, etc. In each instance, power and multiplexed communication can be provided across the movement mechanism that provides the movement relative to two more degrees of freedom. For discussion purposes herein, the movement mechanism with two-axis linear movement and rotational movement will be described.

With reference to FIGS. 8A-8D, the rotational connection 18 is generally disposed between the treatment device 12 and the trolley 24. More particularly, the trolley 24 includes a support structure in the form of a housing 30 that rotatably supports a shaft 32 of the treatment device 12. The support structure for the rotatable connection 18 may also be provided by other structure, such as in cases where a trolley and wash bridge arrangement is not used. Reference to the support structure or trolley 24 may be interpreted to include other structure that remains rotationally fixed and by which a rotational component is supported for rotation relative thereto. For purposes of discussion, the support structure will be referred to as the trolley housing 30. The shaft 32 is rotatably driven by a motor 34 disposed within the trolley and controllable by the main controller 20 to rotatably orient the treatment device 12 in a desired orientation. The shaft 32 and the treatment device 12 may be controlled and rotated to achieve complex rotation and position, including full 360 degree rotation and beyond. As described in further detail, the treatment device 12 is capable of being operated without being "reversed" or returned to a zero position state following an initial rotation. Put another way, the treatment device 12 is not limited in its degree of rotational travel, and maintains its ability for smart control and operation throughout multiple continuous and full rotations in the same rotational direction, unencumbered by cables or wires having the potential to wrap around or limit the permitted amount of rotational travel.

As shown in FIGS. 9A-9G, the rotational connection 18 includes a slip ring 36. The slip ring 36 includes a first portion 36a, in the form of a support bearing housing, fixed relative to the trolley housing 30 (and defining an "outer" support bearing housing), and a second portion 36b, in the form an inner member, fixed relative to the treatment device 12 and shaft 32, and which rotates relative to the first portion 36a ("outer" support bearing housing). During rotational operation of the treatment device, motor 34 rotatably drives the shaft 32 relative to the trolley housing 30, and second portion 36b accordingly rotates relative to the first portion 36a. First and second portions 36a, 36b remain electrically connected via multiple circuits and electrical connections through the entire 360 degrees of rotation. Thus, multiple electrical connections and contacts can be maintained regardless of rotational position.

The first portion 36a of the slip ring 36 includes a plurality of inputs/outputs connected to corresponding inputs/outputs from the main controller 20. Because the first portion 36a is fixed relative to the trolley housing 30, cabling/wiring may extend and connect to the first portion 36a from the main controller 20 without substantially restricting or limiting the necessary movement of the trolley 24, because the trolley 24 simply translates relative to the bridge 26. Thus, the trolley 24 still has an energy chain (not shown) from the main controller 20 that is moveable along this relatively simple linear motion.

The first portion 36a may be fixed relative to the trolley housing 30 via a support plate 37 having a plurality of support posts 37a that are fixed to the base of the trolley housing 30. The first portion 36a may have a generally cylindrical shape, and is shown disposed below the support plate 37 and above the base of the housing 30. The first portion 36a supports the rotatable second portion 36b therein and thereby also supports the rotatable shaft 32 that is fixed to the second portion 36b. A further bearing housing 37b is disposed above the support plate 37 and also supports the shaft 32 for rotation therein. A drive element or sprocket 33 may be disposed above the bearing housing 37b, the sprocket 33 being fixed to the shaft 32 and which is driven by the motor 34 to rotate the sprocket and attached shaft 32 relative to the bearing housing 37b and the fixed first portion 36a of the slip ring 36. An anti-rotation bracket 37b (disposed below plate and attached to the posts 37a) is part of the overall support structure that also includes the support plate 37, the support posts 37a, and the bearing housing 37b. The shaft 32 is hollow and rotatable relative to a fixed upper portion (which receives fluid provided by the vehicle treatment system, such as water, soaps, chemicals, etc.) The rotatable shaft 32 rotates along with the sprocket 33 and the second portion 36b of the slip ring 36, such that the fluid is delivered to the treatment device 12 via the shaft 32 during the full rotation of the treatment device 12.

To continue the electrical communication downstream, the second portion 36b of the slip ring 36 includes a plurality of inputs/outputs connected to the sub-controllers 22 on the treatment device 12. Each sub-controller 22 may include multiple additional inputs/outputs extending therefrom and connected to various controllable devices such as lights, actuators, valves, and/or the like. Thus, both fluid transmission and signal transmission is maintained throughout the complete rotation of the treatment device 12.

Figure 10:
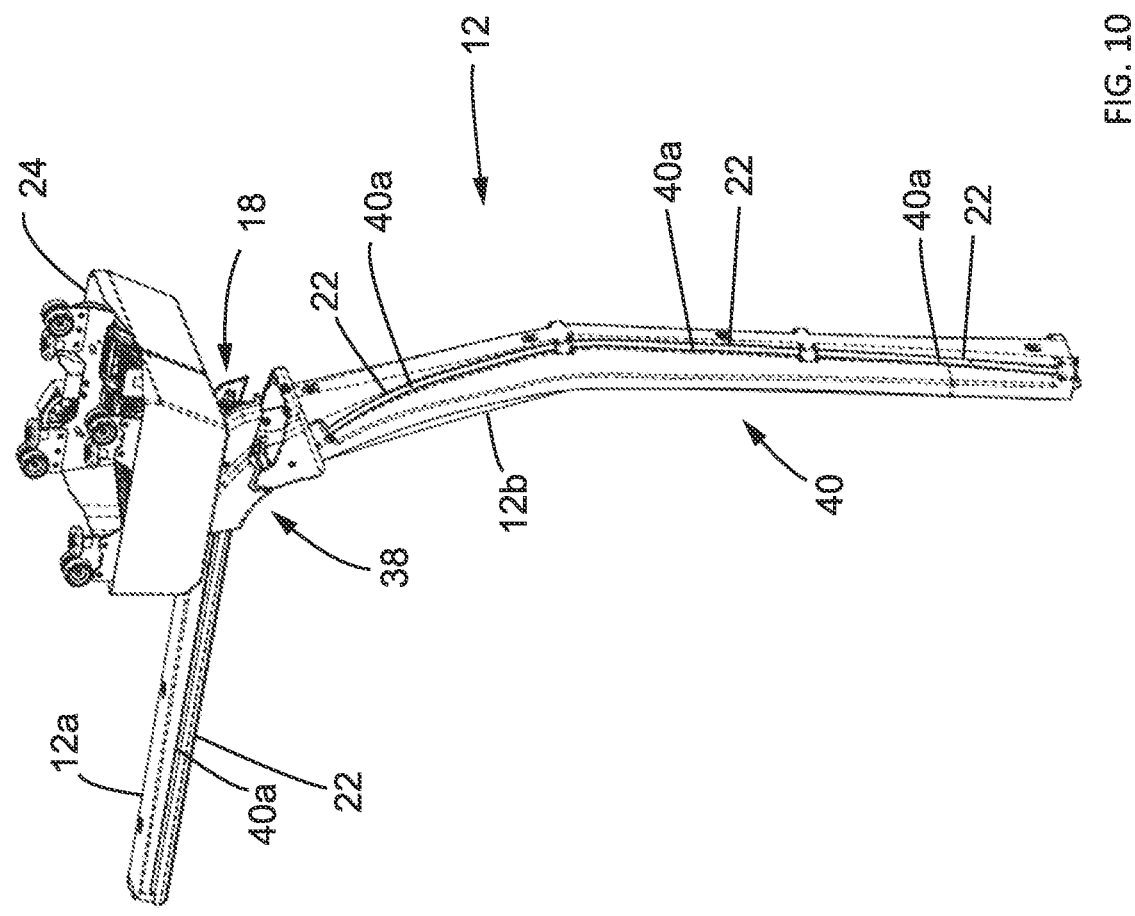
FIG. 10 is a perspective view of the vehicle treatment device supported by the trolley and including multiple controllable light strips.
Figure 10A:
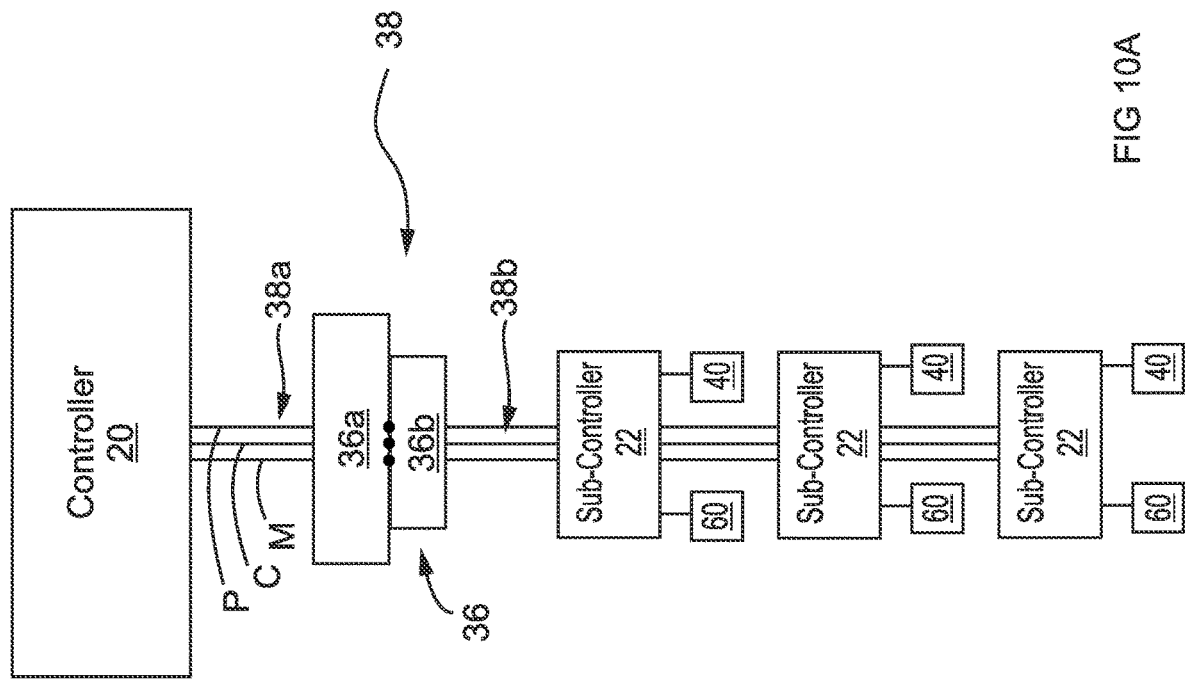
FIG. 10A is a schematic view of a multiplexed communication connection being made across the slip ring device from a main controller of the vehicle treatment area to sub-controllers on the rotatable vehicle treatment device.

FIG. 10A illustrates a schematic of a multiplexed communication connection 38 provided through the slip ring 36. In one aspect, a first set of wires 38a extends from the controller 20 to the first portion 36a of the slip ring 36. A second set of wires 38b extends from the second portion 36b of the slip ring 36 and to the sub-controllers 22. The sub-controllers 22 are each connected to the various activatable components that are controlled by the sub-controllers 22. The multiplexed communication connection 38 is made across the slip ring 36, via the slip ring connections between the first and second portions 36a and 36b.

The number of inputs/outputs extending from each side/portion of the slip ring 36 is preferably minimized in order to minimize the physical size of the slip ring 36 at the rotational connection. The electrical connections and contacts at the slip ring 36 require physical surface for each connection. Accordingly, it is not feasible to include a connection on the slip ring 36 for each of the multiple desired controllable devices (such as lights or valves) on the treatment device 12, because such a slip ring would be prohibitively large. Thus, in one approach, three connections are provided at the slip ring 36: power P, common C, and communication M (for multiplexed communication). In one approach, communication M may be provided wirelessly to the sub-controller 22, such as via Wi-Fi, Bluetooth, or other radio signal, and the slip ring 36 may be sized and configured to include only two connections: power P and common C. It will be appreciated electrical terminology may vary, and that various numbers of wires or connections may be provided in line with the spirit and scope of the disclosure. For instance, wires may also be referred to as "hot" or "ground" wires, and the common wire may provide grounding. Grounding may also be provided through various structural connections between the components of the system. In the illustrated embodiment, the three wires are provided at the rotational connection of the slip ring 36, but it will also be appreciated that additional wires can be provided (typically with a corresponding increase in size of the supporting structure to accommodate the additional connections). In general, the purpose of the slip ring is to provide both power and communication across the movement mechanism that is disposed in the operable path between the main controller 20 and the sub-controllers 22 that are disposed on the treatment device 12. The movement mechanism in the illustrated embodiment may include the slip ring, trolley, and wash bridge, but other movement mechanisms providing multiple degrees of freedom may also benefit from providing power and multiplexed communication via a reduced set of wires between a main controller 20 (remote from the treatment device 12) and a sub-controller 22 (on the treatment device). For purposes of the discussion, the three-wire embodiment will be further described.

The first portion 36a and the second portion 36b of the slip ring 36 are disposed below the support plate 37 and may extend through an aperture formed in the base of the trolley housing 30. The second portion 36b is fixed relative to the shaft 32 and rotates along with the shaft 32. Any wires extending from the second portion 36b will not hinder rotation of the shaft 32 due to the common rotation therebetween.

As discussed previously, lights have been generally provided on vehicle treatment devices, but with greater restrictions on functionality. For instance, a strip of LEDs have been provided on a rotatable vehicle wash brush, for instance at 3 or more locations, such that the lights are visible during rotation of the brush. However, these LED strips are not configured for complex control and illumination. Rather, the entire strip is either turned on/off, and the strip illuminates only the single color of the installed strip. While power and an on/off signal are provided through a slip ring connection from the main controller, the slip ring is limited in the number of connections that can be provided. Such treatment devices do not include any sort of sub-controller or microchip installation on the treatment device downstream from the slip ring, and rely solely on the basic on/off control and power provided from the upstream side of the slip ring.

Similarly, for spray arches having a light feature, these spray arches are typically disposed on both sides of the vehicle and are generally limited to 180-270 degree rotation, requiring the spray arch to return to a zero state, and never completing a full rotation, due to the cable bundling that extends along the arch to provide basic on/off functionality. While these arches may include multiple lights in some approaches, these lights are separate and also individually controlled by the upstream main controller and require their own control cable that extends across the pivot connection, and are therefore also limited in the number of possible lighting or other control combination. Even with a few extra colors provided by the additional cables, the light strips still fully illuminate, with the single activated color along the entire length of the strip. Each strip of light has its own individual wires extending into the moving arch. A larger quantity of wires is less reliable and more costly to run to a dynamic (and still limited) arch.

With reference to FIG. 10, the present disclosure overcomes these limitations through the use of the sub-controllers 22 disposed on the vehicle treatment device 12 itself, thereby providing for increased control possibilities on the vehicle treatment device 12 while only requiring a small number of connections passing through the rotational connection 18. The increased control possibilities, coupled with the ability to fully rotate the device 12 and without requiring a return to a zero position greatly expands the possibilities for providing a premiere vehicle treatment experience. However, it will be appreciated that the present disclosure also provides advantages to limited rotation systems, with the sub-controller 22 being provided on the limited rotation treatment device in a manner similar to its provision on the full rotation device described in detail herein. In this aspect, multiplexed communication provided by a single wire or a reduced number of wires to the sub-controller 22 still reduces the number of overall wires, and provides the ability for complex lighting schemes or valve control schemes (or other component control schemes), with the specific control signals provided by the sub-controller 22 to the lights or valves after receiving the multiplexed control signal from the main controller 20.

Thus, the use of the sub-controller 22 and additional associated microchips into a moving treatment device 12 allows for simplified physical wiring, while still allowing complicated functions and algorithms used to control components on the treatment device 12.

Running advanced communication methods through a single line/wire/channel/bus to the treatment device 12 takes up less space than running individual wires to the arch. Having a smart treatment device 12 allows lights to have smaller increments and pixels. A single communication channel/wire/connection/bus passing through the rotational connection 18 can control hundreds of light sections/colors (without requiring hundreds of wires). The advanced communication provided by the sub-controller 22 on the treatment device 12 also allows for control of multiple electromechanical devices in addition to lights. For example, these electromechanical devices may include fluid valves, actuators, motors etc. This advanced communication, and smart device, will also allow feedback from the moving treatment device 12 back into main controller 20 of the vehicle treatment system. This feedback may include sensor feedback, position/angle data, preventative maintenance feedback, diagnostics, etc. to allow the main software at main controller 20 to perform proper actions.

It will be appreciated that the reference to the multiplexed data channel is not intended to be strictly limited to a single line or wire. While one current embodiment may have a single 'data line', such line also relies on the ground line as a reference. Furthermore, there are many communication buses that utilize a differential pair and/or multiple sets of lines/pairs for data transmission (such as with RS485, Ethernet, etc.). Accordingly, the present disclosure is not limited to communication protocols that only have a single physical line.

With reference to FIGS. 10 and 10A, the communication between the main controller 20 and the sub-controller 22 is provided by the multiplexed communication connection 38 (or wireless channel) from the main controller 20 across the dynamic motion interface provided by the rotational connection 18 to the sub-controller 22 in the vehicle treatment device 12, with the multiplexed communication M signals received at the sub-controller 22 initiating, via software algorithms, multiple selectable actions for the devices/components of the treatment device 12 as part of vehicle treatment/car wash process. This multiplexed communication connection 38 also communicates sensor and diagnostics data back to the main controller 20 via communication M. As provided in the present disclosure, the multiplexed communication connection 38 is provided through the slip ring 36. However, in non-slip ring rotatable connections (such as limited rotation implementations utilizing certain aspects of the present disclosure), the multiplexed communication connection 38 may be in the form of a physical wire or cable. Communication, and/or power, can also be provided wirelessly, with or without a slip ring or support bearing connection. For example, power may be provided by induction or from pressure provided to the treatment device 12.

The main controller 20 of vehicle treatment systems typically has various sub-controllers 22 with a communication distribution and network, with the main controller 20 having the high level software. The main controller 20 may be located in a fixed location within the facility or may be located on the main wash assembly, which might be referred to as frame/gantry/bridge/carriage/head assembly.

By using the single multiplexed connection 38 from the main controller 20, the size of the slip ring 36 can be minimized, such that fewer wires and connections are necessary at the moving machine interface of the rotational connection 18. Thus, for a given size, wash capability can be increased (higher capability in a smaller package, allowing installation in smaller spaces), and costs may be decreased. Additionally, by using fewer wires, the potential failure points are decreased. Thus reliability is improved using fewer dynamic conductors, while still allowing complex functionality provided by the treatment device 12 (arch, brush, etc.). These advantages of reduced wires are also present for non-slip ring connections, such as a wire/cable connection across a rotational interface that does not use full rotation.

As described previously, one example of the smart vehicle treatment device system (whether slip ring or cabled) includes the use of three wires (power P, common C, communication M). Using this approach, in one example, the light color on the treatment device 12 can be changed/controlled with software (via sub controller 22) on about 80 sections of an arch (8000 mm arch length, with specific control of 100 mm sections). In a traditional design, in which no controller is provided on the arch and a three-color RGB LED strip is used, to achieve the same level of 80 sections of multi-color control, the traditional approach would require 320 wires extending across the moving machine interface (80 sections each having 4 wires), which is impractical.

As described, the ability for the treatment device 12 of the present disclosure to rotate fully and be positionable around the entire vehicle body (such as in FIGS. 3-6) via the trolley 24 and associated wash bridge 26 and frame 27 can be considered "complicated" movement. Such movement is not possible or feasible under traditional translational or limited rotational movement coupled with simple festooned cables of existing products with limited control (such as single light on/off controls and/or partial rotation to allow for wire bundles to extend along the motion coupling). Thus, the present disclosure provides for both increased control of device-mounted components (such as lights or valves) via sub controller 22, as well as increased range of rotational movement (via slip ring 36) of the vehicle treatment device 12 on which the lights/valves/etc. are mounted.

While a full rotational spray treatment device 12 is illustrated herein, it will be appreciated that rotational wash brushes may also fully rotate and perform complicated movement according to the present disclosure, and other treatment devices may similarly benefit from the ability to perform complicated movement while also containing a high quantity of controllable elements. Thus, the present disclosure is not limited to trolley-mounted spray arches.

The present disclosure also generally illustrates a full rotational spray treatment device 12 in various positions relative to a vehicle being in a fixed position (such as in FIGS. 3-6), with the spray treatment device 12 controllable to move entirely around the fixed vehicle position via the frame/bridge structure. The combination of rotational and translational movement (movement along two degrees of freedom at the same time with communication occurring during the combined movement) is another example of complicated movement. Complicated movement may also be defined to include the combination of two linear translational movements, two linear translational movements and a rotational movement, three linear translational movements, etc.

Complicated movement can therefore also include other vehicle treatment devices that do not necessarily have the same full rotational capability of the present disclosure. For instance, a pair of generally vertical spray devices may be disposed on both sides of the vehicle and pivot/rotate relative to the vehicle while at the same time translating along the length of the vehicle and/or side to side to face the front/rear bumper. Such movement does not require full rotation of the treatment device. However, the use of the sub-controller 22 on such a limited rotation treatment device provides for substantially increased control of the controllable components mounted to the device, with the specific control signals being provided to the sub-controller 22 by the multiplexed communication cable/wire. As mentioned above, complicated movement can therefore also exist in non-rotational settings, such as translation front to back and side to side at the same time, and does not necessarily require partial or full rotational travel.

With reference to FIGS. 10 and 11A-11D, the system 10 will be described according to an exemplary embodiment, in which a fully rotational spray treatment device 12 includes a plurality of lights 40 along the length thereof. The spray treatment device 12 is supported via trolley 24, which trolley 24 is translatable side to side along wash bridge 26 (See FIGS. 3 and 4), which is translatable fore-and-aft along frame 27 (See FIGS. 5 and 6).

As shown in FIG. 10, the plurality of lights 40, in one aspect, are multi-color LED light strips, and include sub-controllers 22 in the form of microchips disposed about every 4 inches along the length of the treatment device 12. Three wires (power, common, and multiplexed communication) are provided by main controller 20 to slip ring 36, and from slip ring 36 to the plurality of lights 40 and the associated sub-controllers 22. In this example, the treatment device 12 is designed to be fully rotational and use the slip ring 36 connection. The specific control scheme that determines which of the lights 40 to illuminate and which color is provided by the main controller 20 and communicated via the multiplexed communication wire to the various sub-controllers 22, which will activate the specific lights as desired.

As shown in FIGS. 11A-D, the wash bridge 26 and/or the surrounding areas of the vehicle treatment area 14 may also include further lights 42, including fixed lighting on the wall or ceiling or on other treatment structure, which may be controlled via corresponding signals from the main controller 20 to complement the lighting scheme being provided on the active treatment device 12, as desired. For instance, the further lights 42 can match the lights 40, or can be a different color, and can be provided in a constant or pattern illumination, for example.

The lighting provided on the treatment device 12 may be independently controlled relative to the motion of the treatment device 12 that is occurring. Lighting may be controlled and changed while the treatment device 12 is stationary, or may be constant while the treatment device 12 moves, and may change during movement of the treatment device 12.

The treatment device 12 is shown with an upper portion 12a and a side portion 12b. The lights 40 on each portion may be controlled to be the same color, or may be different colors, depending on the signal provided by the main controller to the sub-controllers 22 via the multiplexed communication wire. Thus, it will be appreciated that the multiplexed communication provided to the lights 40 allows for a variety of lighting schemes that may be changed and controlled according to user preferences.

In one aspect, shown in FIG. 10, the lights 40 are provided in serially connected light strips 40a, with the sub-controllers 22 disposed along the serial connection. The multiplexed signal transmitted through the communication wire M of the set of wires 38b is therefore received at each of the serially connected sub-controllers 22. The serially connected light strips 40a likewise are connected to the same power wire P and common wire C extending along the treatment device 12.

As the treatment device 12 rotates relative to the trolley 24, the second portion of the slip ring 36b and the multiple wires 38b extending therefrom remains in generally the same position relative to the treatment device 12, such that continuous rotation of the treatment device 12 does not affect the communication and power being provided to the lights 40.

The various control schemes for the lights 40 may be provided in a similar manner to other types of controllable components, such as actuators and/or valves, attached to the treatment device 12, such that the lights 40 or other components may be activated only at the top or the bottom of the middle of the treatment device 12, as desired. The particular lights 40 or other components to activate may depend on the type of control scheme being activated by the main controller 20 and on the particular phase of the vehicle treatment process.

Figures 11A, 11B:
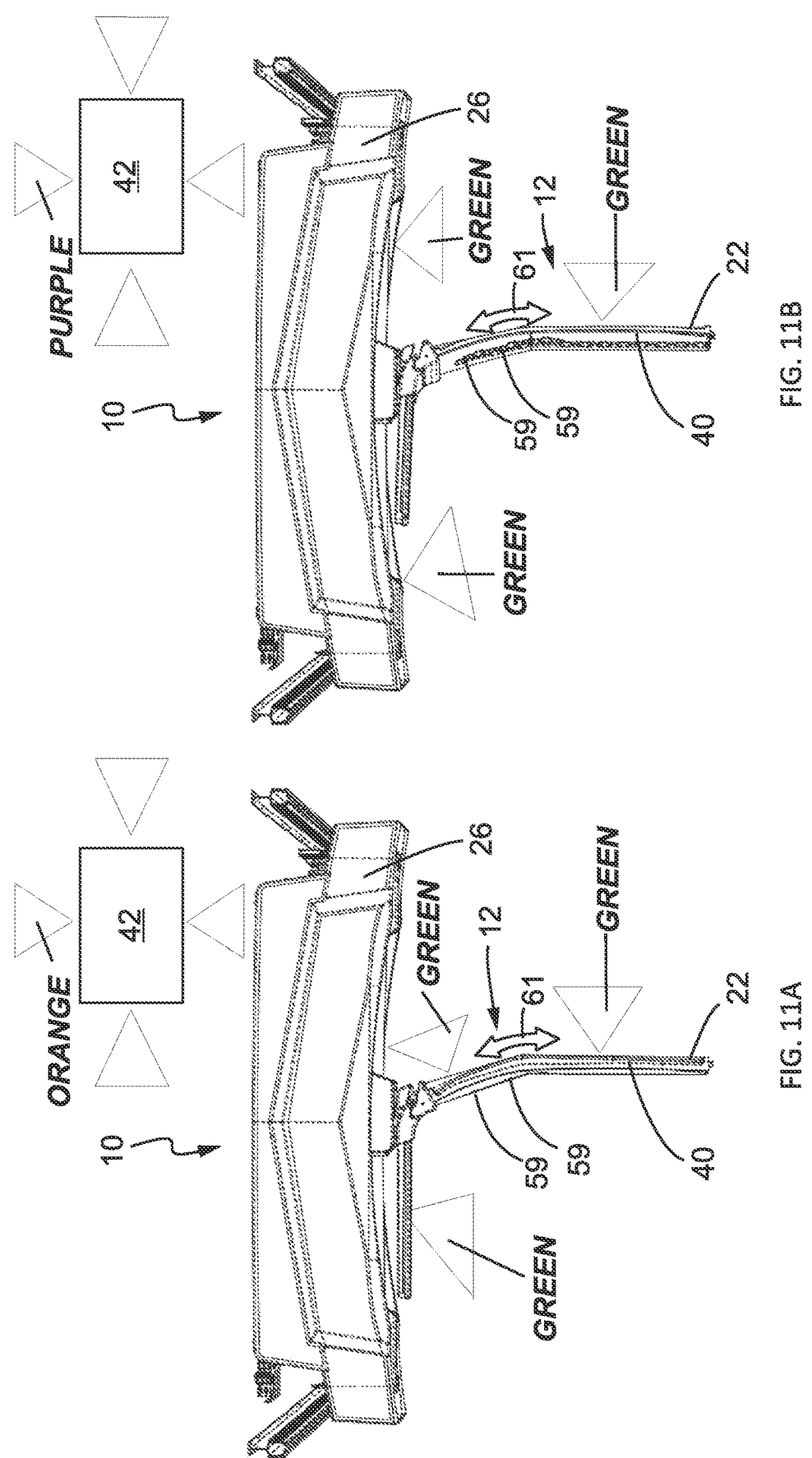
FIGS. 11A-11D are operational views of the vehicle treatment system and device illustrating various rotational states and capable of various illumination states provided by the system.
Figure 11D:
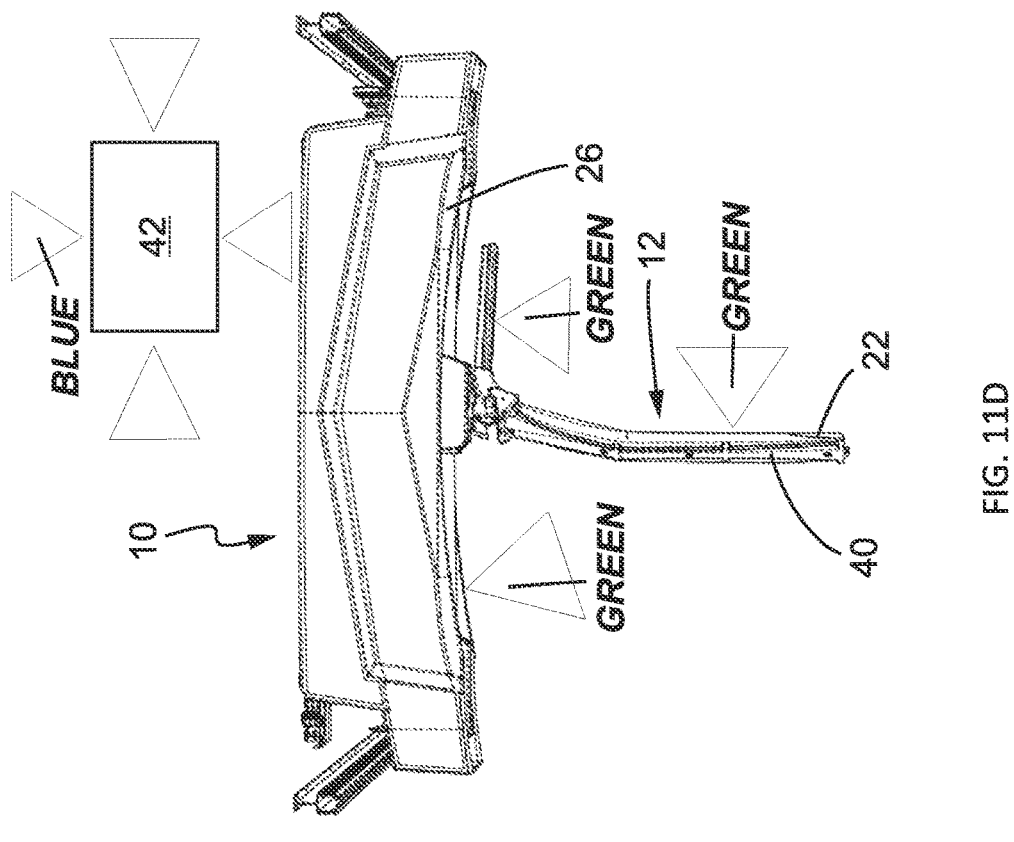
Figure 11C:
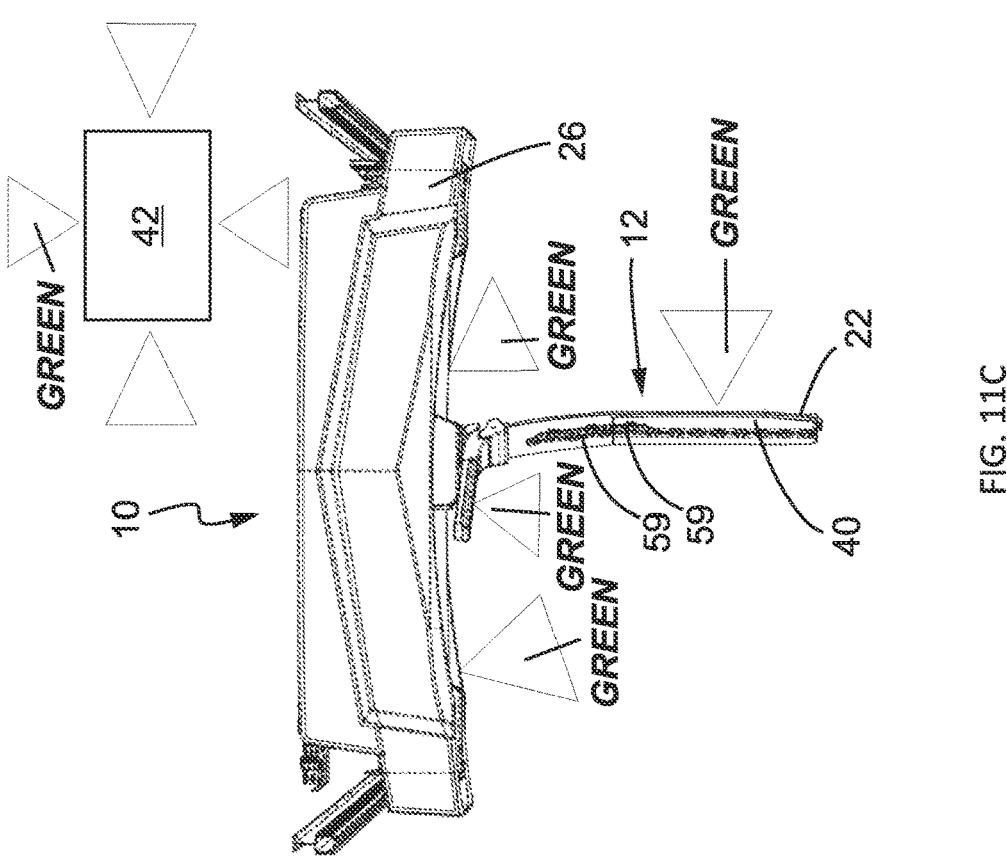

FIG. 11A illustrates multiple colors being illuminated in the facility, with the treatment device 12 being green and the surrounding area being orange. The drawings are shown in black and white, with the light colors illustratively labeled with the name of the color. It will be appreciated that the indicated lights and the description herein can be readily understood in relation to the black and white line drawings. FIG. 11B illustrates the treatment device 12 and wash bridge 26 being green and the surrounding area being purple. FIG. 11C illustrates, the treatment device 12, wash bridge, 26, and surrounding area all being green. FIG. 11D illustrates the treatment device 12 and wash bridge 26 being green and the surrounding area being blue. Various rotational positions of the treatment device 12 are also illustrated in these figures, thereby illustrating the rotational ability of the treatment device 12 along with the varying color control of the lights 40 in this example embodiment. It will be appreciated that a variety of different lighting schemes, or other controllable component schemes, are likewise available on other arch implementations, with such variety of control being provided to the rotatable treatment device 12 or other treatment device configured for movement, including complicated movement. As used herein, if a particular color, pattern, intensity is described in an example, the described color will be interpreted as being illuminated and visible in the corresponding structure illustrated in the figures.

Figures 12A, 12B:
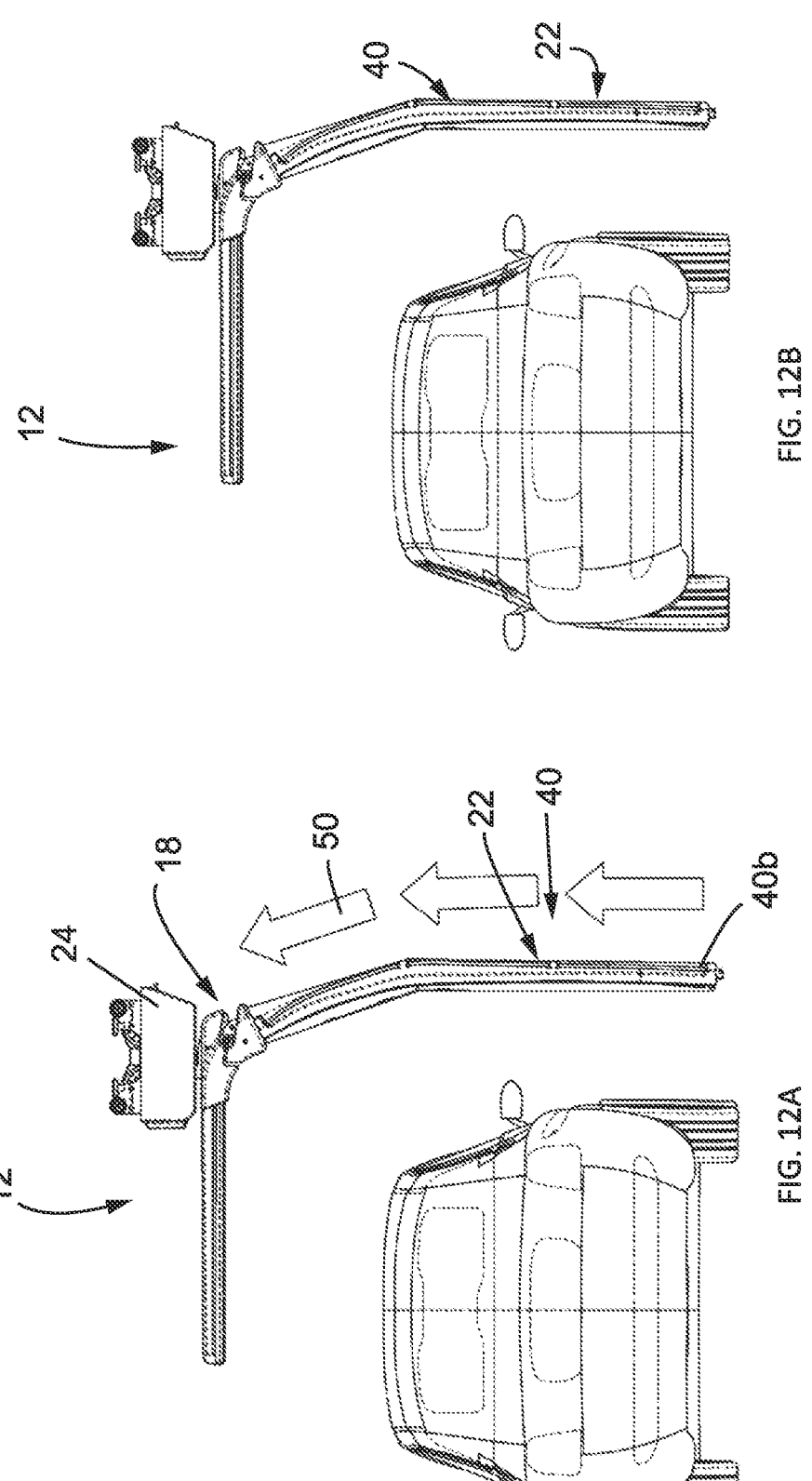
FIGS. 12A-12B are operational views illustrating a vehicle entering the vehicle treatment area and the treatment device illuminated in green, and the vehicle within the vehicle treatment area and the treatment device illuminated in red to provide a stop signal.

With reference to FIGS. 12A-12B, a loading phase of the smart vehicle treatment system 10 is illustrated, illustrating one aspect of the variable control of the lights 40. In FIG. 12A, the vehicle enters the vehicle treatment area 14. The plurality of lights 40 may be activated in a first color, such as green, to indicate that the driver should continue to move the vehicle forward. The first color may pulse or change in intensity, such as pulsing between light green and dark green. The top portion 12a of the treatment device 12 and the side portion 12b of the treatment device 12 may pulse at the same rate.

In one aspect, a dark green spot (or traveler 40b) may be provided on the treatment device 12 that travels upward at a first rate (for example along the arrows 50 illustrated in FIG. 12A). The traveler 40b may travel at an increased rate to signal to the driver to move more quickly.

Upon reaching the desired location, shown in FIG. 12B, the lights 40 may change from green to second color, such as red, to signal to the driver to stop. The red color may start off dark, and may be become lighter once the system 10 confirms that the vehicle has come to a stop. Following the loading phase, the vehicle treatment phase (wash, dry, or other treatment) may commence.

Figures 13A, 13B, 13C:
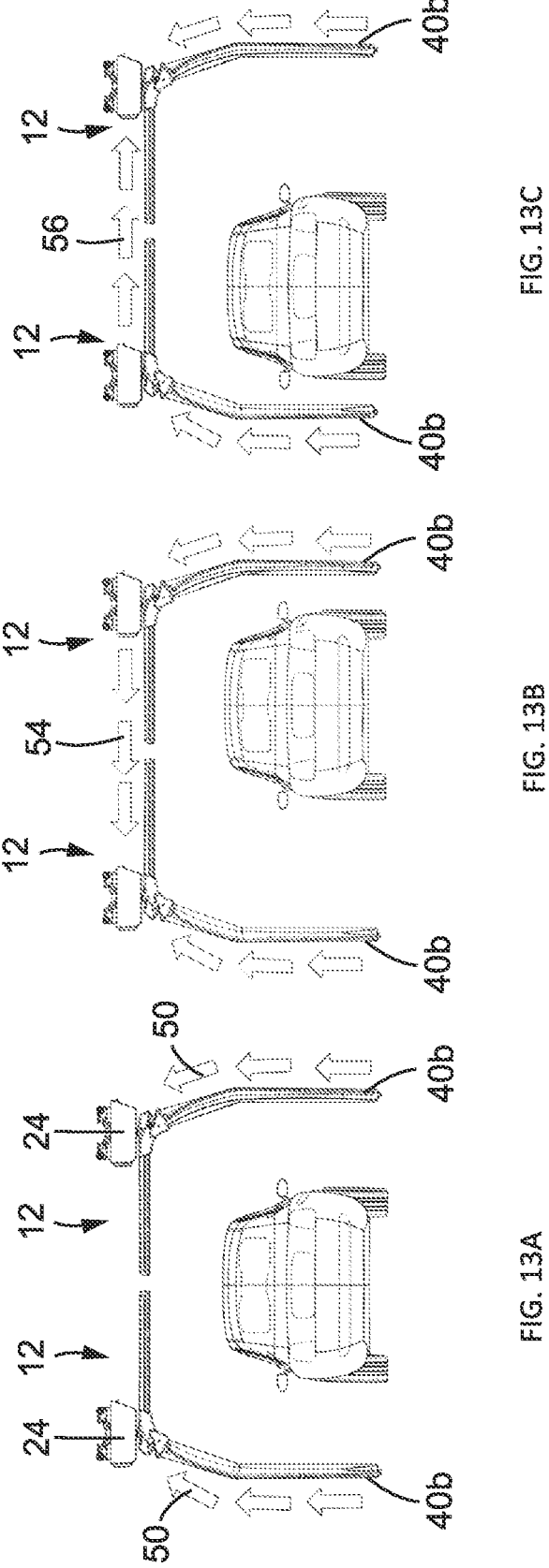
FIGS. 13A-13C are operational views illustrating a vehicle centered within the vehicle treatment area, laterally offset to the right and the system providing illumination instructing the vehicle to move left, and laterally offset to the left and the system providing illumination instructing the vehicle to move right.

FIG. 13A-13C illustrate another example vehicle treatment process, in a system 10 having two arches 12 and trolleys 24 on each side of the vehicle treatment area 14. In this approach, the system 10 may operate in a similar manner for a vehicle loading process, but may also include signaling to the driver with regard to the lateral position of the vehicle.

For example, when the vehicle is centered, as shown in FIG. 13A, the traveler 40b described above may move symmetrically up both the left and right side arches 12 according to arrows 50, such that the traveler is on both sides and terminates together at the corner of the treatment device 12.

When the vehicle is offset to the right, for example in FIG. 13B, the traveler 40b on the right may progress up the right side arch, and across the upper portion of right side 12 and continue on to the upper portion of the left treatment device 12. This movement of the traveler 40b scrolling upward and from right to left is indicated by arrows 54 in FIG. 13B.

A similar movement of the traveler 40b is shown in FIG. 13C for instances where the vehicle is offset on the left, with the lights 40 being illuminated to move the traveler 40b along arrows 56 to scroll up and to the right.

Thus, the lights 40, whether on a single arch or double arch design, can use an animated traveling light 40b to signal to the driver both to proceed forward or stop and also to shift the vehicle in a particular direction. The particular signal being provided to the driver by the control of the lights 40 is based on vehicle detection sensors that communicate to the main controller 20 the actual position of the vehicle, with the main controller 20 using this information to determine the particular lighting scheme, and providing the resulting light scheme signals over the multiplexed communication 38 to the treatment device 12 and the sub-controllers 22 disposed thereon.

In another aspect, not explicitly shown, the color of the lights 40 may be pulsed or otherwise animated depending on other environmental conditions. For example, the lights 40 may be controlled to correspond to the beat or volume of music being played at the facility. Such audio and light entertainment may be provided, for example, during low noise volume phases of a vehicle treatment process, such as when low pressure applications are being performed, or a chemical treatment is being given time to complete.

As described above, in addition to the lights 40, other components can be specifically controlled along the arch 20 via the single multiplexed communication wire, either as an alternative to a lighting scheme or in addition to the lighting scheme.

With reference to FIGS. 11A-D and 14A-B, a plurality of outlets 59 with valves 60 are also disposed on the treatment device 12, in addition to the lights 40. In this aspect, a single fluid path 61 may be provided through the treatment device 12, with multiple outlets 59 disposed along the length of the treatment device 12 that are each fluidly connected to the fluid path 61, with the valves 60 controlling which of the outlets are open and which are closed. The multiplexed communication 38 provided to the treatment device 12 can also be used to activate (open/close) the specific valves 60a, 60b, 60c, etc. depending on the desired control scheme.

Fluid transfer, like electrically connectivity, can be difficult over complicated motion, such that providing fluid to specified outlets through a moving connection can be limited. However, the use of the single fluid path 61, with specific valve control via the sub-controllers 22 allows for specialized treatment using such a single fluid path 61. However, in some aspects, multiple fluid paths 61 may also be provided, such as a fluid path for high pressure/high volume wash water and another path for small volume/low pressure chemical fluid. The control valves 60 (or other components/actuators) described herein are therefore applicable to such additional fluid paths, and are not intended to be limited only to single fluid paths, even if a single fluid path is most commonly used in the industry.

Figure 14B:
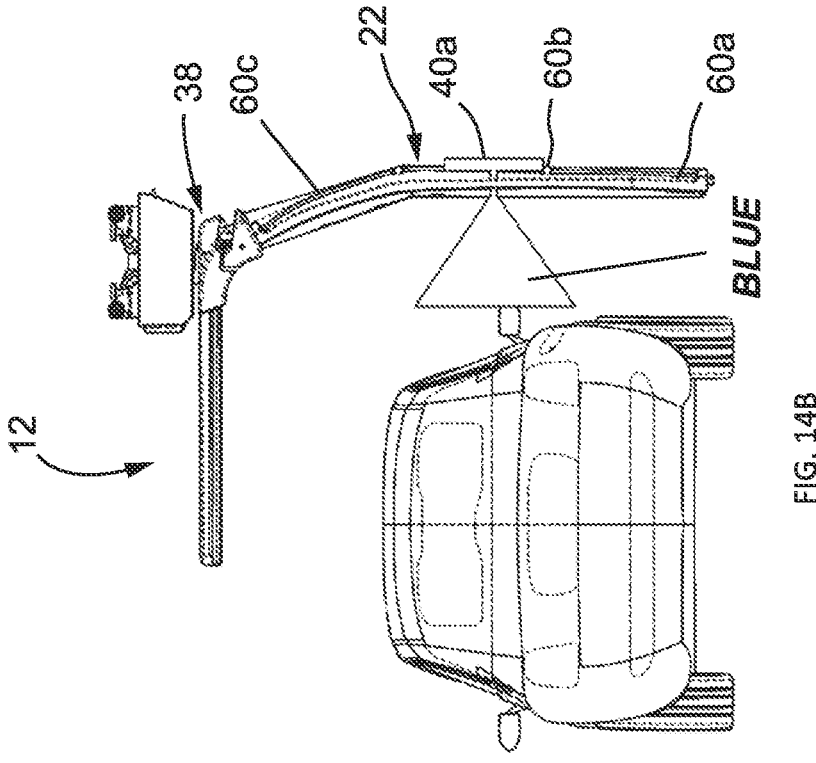
FIGS. 14A and 14B are operational views illustrating the vehicle treatment device being activated to wash the wheels and illuminated in yellow corresponding to the activated treatment scheme, and being activated to wash the mirrors and window and illuminated in blue corresponding to the activated treatment scheme.
Figure 14A:
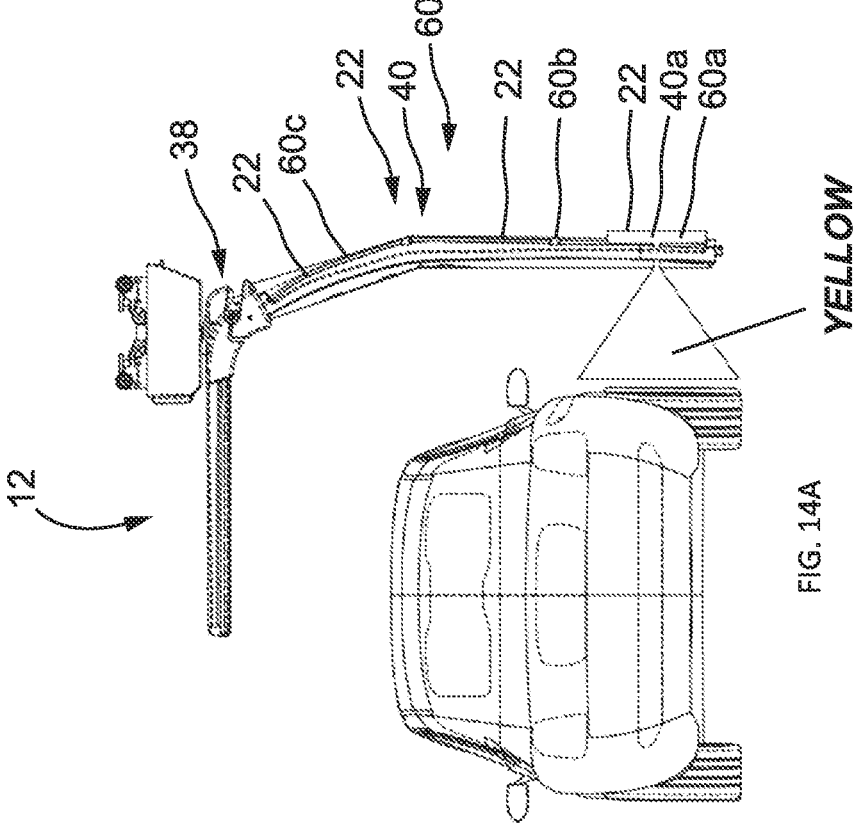

For example, as shown in FIG. 14A, a first chemical treatment is desired for treating the wheels of the vehicle. In this aspect, a signal is sent via the multiplexed communication 38 to the valves 60a and located near the bottom of the treatment device 12 to be opened. The sub-controller 22 assigned to these valves 60a and corresponding outlets 59 will thereby open the valves 60a at the bottom, while the valves 60b, 60c at the top of the treatment device 12 remain closed. Thus, the chemical flowing through the fluid path 61 within the treatment device 12 will flow through the outlets 59 at the bottom, but not the top. The light strip 40a at the bottom of the treatment device 12 may likewise be activated at the bottom to correspond to the chemical being provided by these open valves 60a. For example, when the chemical is yellow, the lights 40a adjacent the open valves 60a may be controlled to be yellow. This example control scheme thereby provides a signal to the vehicle driver that the chemical treatment is occurring, as well as to others, such as a vehicle driver waiting behind the vehicle being treated, thereby highlighting this specialized treatment. Of course, the color of the light 40 and the color of the chemical could be different and still indicative of the type of chemical being applied.

FIG. 14B illustrates another specific treatment step, in particular for treating the side mirrors with a second chemical. In this treatment scheme, the valves 60a at the bottom are closed, and the valves 60b in the middle near the mirrors are controlled to be opened by the multiplexed communication 38 and the sub-controllers 22. The adjacent lights 40a may be controlled to be blue, corresponding to a blue chemical color, or otherwise indicative of the treatment being performed. This corresponding light 40 and valve 60 control thereby highlights and confirms to the vehicle driver and others that the specific treatment is occurring.

In addition to using the control of select valves 60 to control which areas of the treatment device 12 provide treatment from corresponding outlets, valves 60 disposed within the treatment device 12 may also be used to control a desired mixture of various fluids, chemicals, soap or the like, which may then be provided from one or more outlets. Thus, as described above, whether with a single fluid line or multiple fluid lines, valve control may be used to create a desired mixture that is fed to the one or more fluid lines. For instance, different ratios of additives can be provided into the fluid stream, such as a desired color, in one aspect. Thus, in addition to using valve control to control which sections emit treatment from a given fluid line, valves control can also take multiple inputs and control what is fed into a given fluid line.

The smart control of the treatment device 12 can also be used to signal other events that occur during vehicle treatment, including unexpected events such as collision or interference with the vehicle treatment apparatus. Impact detection in vehicle treatment systems can be accomplished in a variety of ways (a vehicle impact detection mechanism provided by the present disclosure is described in further detail below). In short, sensors may be provided for the treatment device 12 that detect when the treatment device 12 has shifted due to impact and indicate which direction and at what degree of an angle it is impacted. Other vehicle impact detection mechanisms may also be used.

In response to detecting a vehicle impact, the main controller 20 may correspondingly alter the vehicle treatment process, such as by stopping the process to allow for the collision or impact to be remedied. The system 10 herein may also be used to signal to the driver that an impact has been detected.

Figures 15, 16A, 16B:
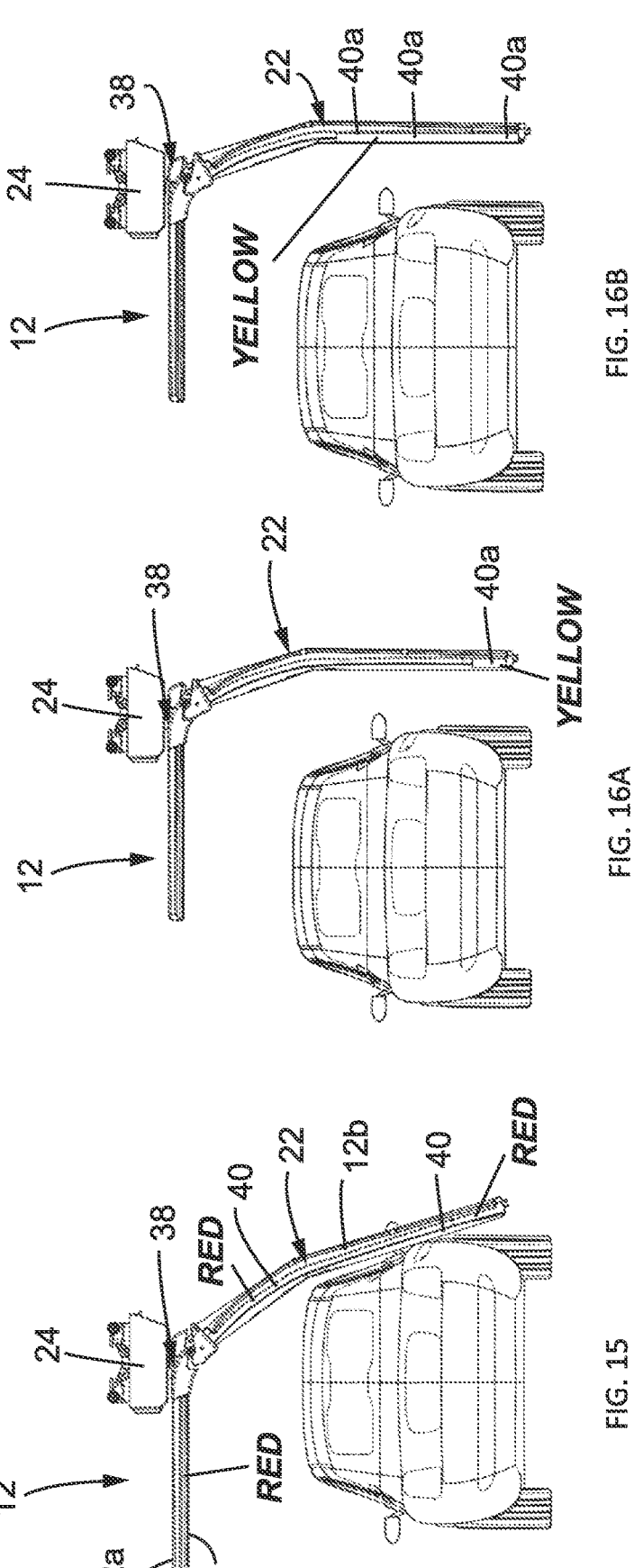
FIG. 15 is an operational view illustrating the vehicle impacting the vehicle treatment device and the device being illuminated in red corresponding to impact detection.
FIGS. 16A-16B are operational views illustrating various illumination states corresponding to a particular intensity level during programming or testing, or before/after a wash process, with a longer illumination along the device indicating a higher intensity level or setting.

As shown in FIG. 15, the vehicle has impacted the side portion 12b of the treatment device 12, causing the treatment device 12 to have shifted. The lights 40 in this situation are illuminated to be red, signaling an impact has occurred. The lights 40 may be controlled to be pulsed between shades of red while the impact is being corrected. The red lights 40 may be controlled to turn off and revert back to their previous state once the main controller 20 determines that the treatment process can resume. The use of the red lights 40 can signal to the driver to stay in place until the red lights 40 turn off.

In one aspect, an impact sensor may be disposed on the treatment device 12 itself, with communication being provided through the multiplexed communication 38 back to the main controller 20. In another aspect, impact sensors may be disposed on or in the trolley 24, and may be provided via a separate communication to the main controller 20, with the main controller 20 relaying the resulting lighting scheme to the lights 40 and the sub-controllers 22 after receiving the impact signal. Impact sensors disposed at the trolley 24 are discussed in further detail below.

In yet another aspect, with reference to FIGS. 16A-16B, the system 10 may be used for maintenance and programming processes. For instance, lights 40 can be controlled to indicate whether a maximum or minimum setting (such as a speed or pressure level) is being set during a programming process, either by illuminating more lights and/or by using a darker shade, for example. Thus, when setting a motor speed, the lights may adjust to confirm the level that is being set, similar to a visible volume bar that appears when adjusting the volume on a television. During a testing/confirmation stage, the lights may illuminate at the speed that is occurring according to the setting that was saved. Thus, during a dry run or test, the programmer can confirm visually that each of the settings were successfully input. Different intensity levels can also be provided before, during, and/or after a wash process, for instance to indicate to the consumer a level of operation, and be specifically tailored to the particular user to indicate a low balance on a prepaid wash card, for example, or whether the consumer is nearing a frequent wash reward based on number of washes.

A similar scheme may be used for setting an audio volume, such as music to be provided during certain processes. Other possibilities include a distance indicator for vehicle detection, dilution control (chemical concentration to be provided), foaming air pressure, etc. It will therefore be appreciated that the lights may be controlled in a variety of ways to provide an indication to the user and/or for aesthetic/marking reasons.

FIGS. 16A and 16B illustrate an example of the lights 40 at a low setting and high setting, respectively, during a test run, to indicate the level of speed/pressure/volume/etc. being provided. At the high setting, a greater number of lights 40 or light strips 40a are illuminated in FIG. 16B, indicating a higher objective level.

The programming of the lighting or other control schemes can be provided remotely, such as through the internet or corporate network to the main controller 20. Because the different types of control and lighting are provided via the same single control wire and the same set of multi-color lights, valves, etc., the system operator need not be present at the treatment facility to make any changes to the system to modify a desired appearance, for example.

Thus, at different times, the lighting schemes can change color, such as for different holidays, sporting events/teams, specific promotions, daily specials, etc. For example, if a half off special is being provided, the system 10 may illuminate in a specific promotional color to signal to people near the facility that the promotion is occurring. These colors schemes may be changed or controlled dynamically and remotely based on various data.

It will be appreciated that reference has been made to a single multiplex signal communication connection, but that multiples of such communication connections may be provided, without departing from the spirit and scope of the disclosure. Each multiplex communication connection allows for control of numerous devices, thereby reducing the overall number of wires, and the provision of additional multiplex communication connections is still a substantial reduction relative to the traditional approach of having single control wire for each activatable component.

Turning now to FIGS. 17A-19B, a more detailed discussion of detecting a positional status of the vehicle treatment system, including impact detection, movement detection, and orientation detection of the treatment device 12 is now provided. As described above, in the illustrated embodiment, the trolley 24 includes a housing 30 in which the motor 34 and slip ring 36 may be disposed. As the treatment device 12 rotates relative to the trolley 24, the treatment device 12 will inherently have a different rotational position. For instances, various rotatable positions of the arch are shown throughout the Figures, including FIGS. 11A-D. The motor 34 is controlled to orient the treatment device 12 as desired, and during continuous motion, the controlled rotation of the motor 24 can typically provide feedback to the controller 20 such that the rotational position can be determined. However, in some instances, the position of the treatment device 12 may become unknown to the controller 20. Because the treatment device 12 is capable of continuous rotation, without necessarily requiring a return to a zero position, it can be desirable for the main controller 20 to determine the rotational orientation of the treatment device 12 in order to activate the motor 34 correctly and position the treatment device 12 as desired. For example, at the end of a treatment session or after an impact, it may be desirable for the controller 20 to move the treatment device 12 to a predetermined orientation and position.

One approach to determining a rotational position is the use of a single analog sensor mounted within the housing 30, along with a machined flag having a tapered surface, such that as the shaft 28 rotates, the specific distance between the analog sensor and the surface of the flag varies, thereby indicating the rotational position of the treatment device 12. However, the sloped and machined flag is expensive to machine and the single analog sensor may lack desired redundancy, and is difficult to adjust. Moreover, the positioning of such a sensor arrangement within the housing 30 occupies valuable space within the housing 30, making it difficult to incorporate a slip ring or other components.

Similarly, one approach of arch impact detection involves the use of a sensor within the housing 30, designed to be a predefined distance from a flag supported on the arch support structure. In the event of an impact, the arch structure pivots, causing the flag to move away from the sensor to indicate an impact. During normal rotation of the treatment device 12, the flag is designed to remain within the designed range of the sensor. However, the mechanical motion transfer system includes a variety of moving parts and tolerances, which can result in the flag being offset from the desired position within the range of the sensor, and therefore not moving away relative to the sensor in the manner as expected and designed, thereby resulting in an actual impact movement not being detected, which is a particularly undesirable failure mode. Similarly, if the various moving parts and tolerances result in an offset position relative to a nominal position, a false alarm may result, where a slight movement or vibration occurs without an actual impact. The false alarm is also undesirable in that it can result in the controller 20 interrupting the treatment process when no impact has occurred. Thus, both a failure to detect an actual impact and a false alarm are undesirable occurrences.

According to the present disclosure, shown in FIGS. 17A-19B impact detection and rotational orientation detection may be provided by a common set of sensors 110, which may be provided at least partially outside of the trolley housing 30 and radially outward relative rotating shaft 32, thereby providing more space for the installation of wires and control components within the trolley housing 30, including the use of the slip ring 36, for example. It will be appreciated that the advantages of the described sensors 110 are not limited to slip ring installations, and that the additional internal space for other components in the housing 30 is but one advantage of the system of the present disclosure.

Figures 17A, 17B:
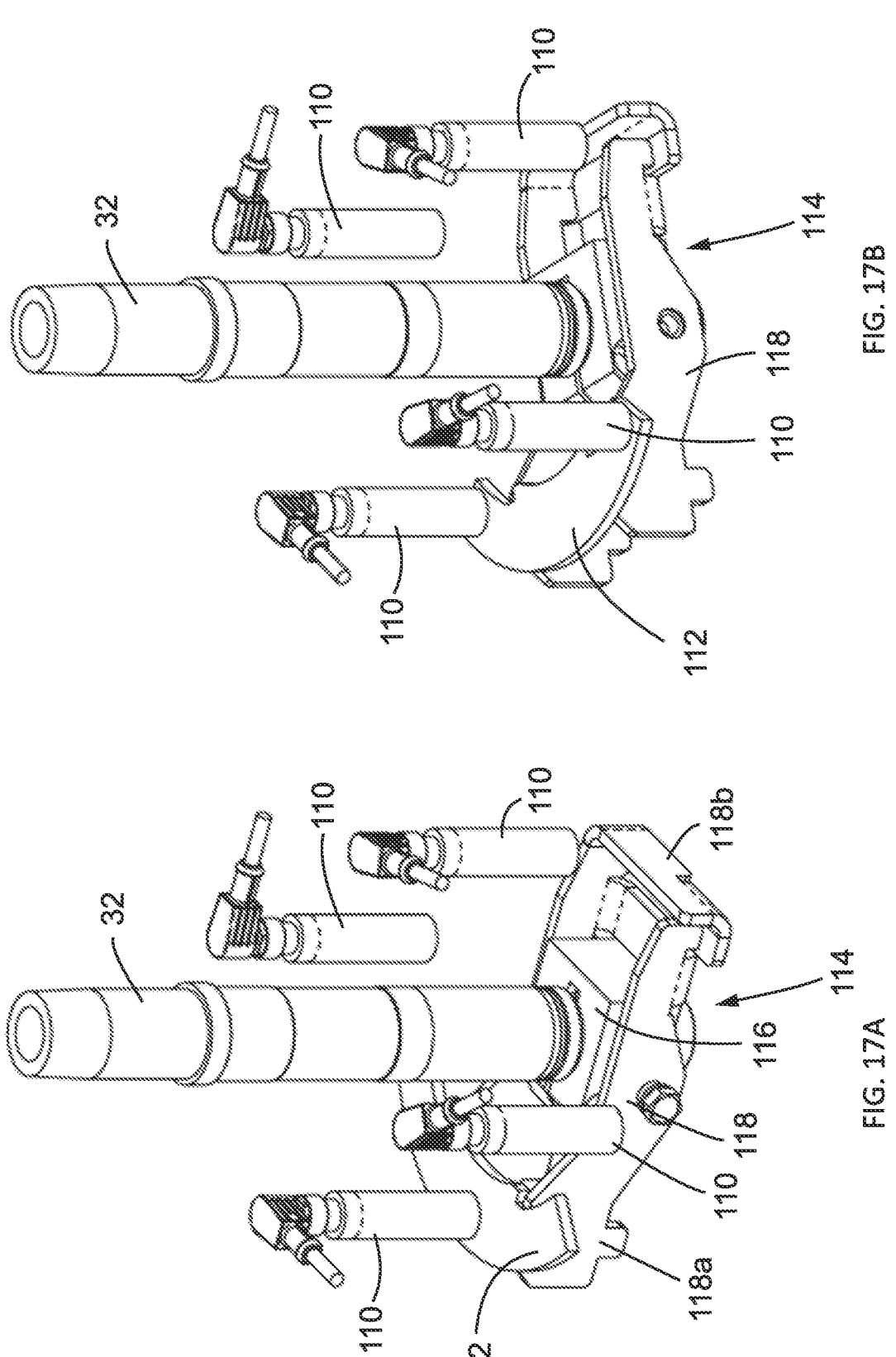
FIGS. 17A-17B are perspective views of a sensor arrangement and flag for detecting orientation and/or impact of the vehicle treatment device.
Figure 18B:
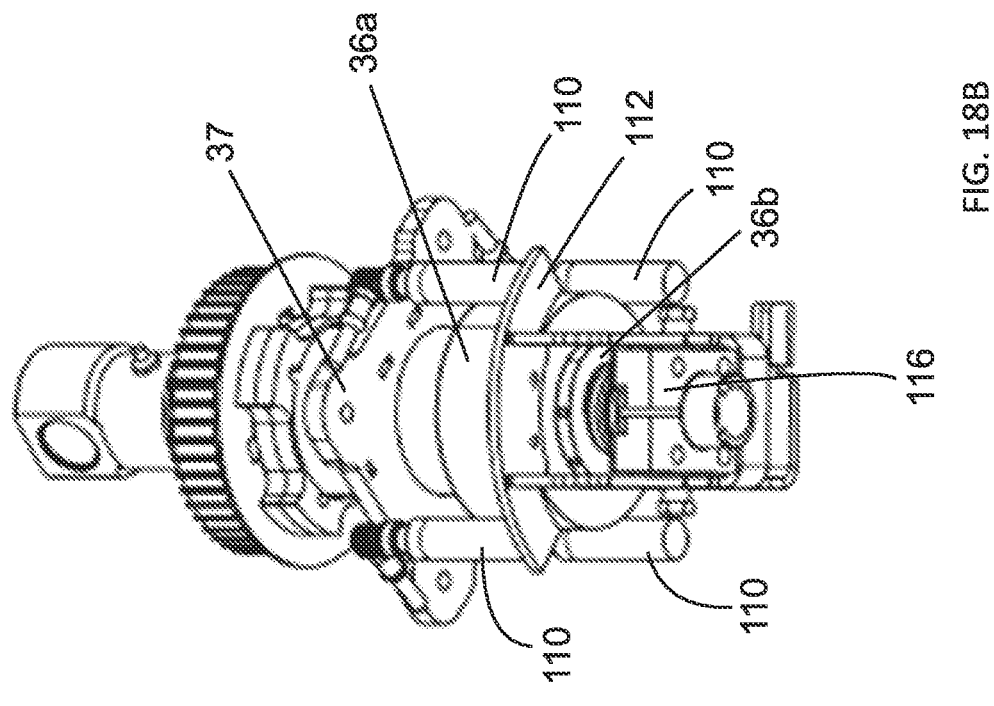
FIGS. 18A-18D illustrate the sensor arrangement and flag relative slip ring structure, including normal operating conditions and an impact state.
Figure 18A:
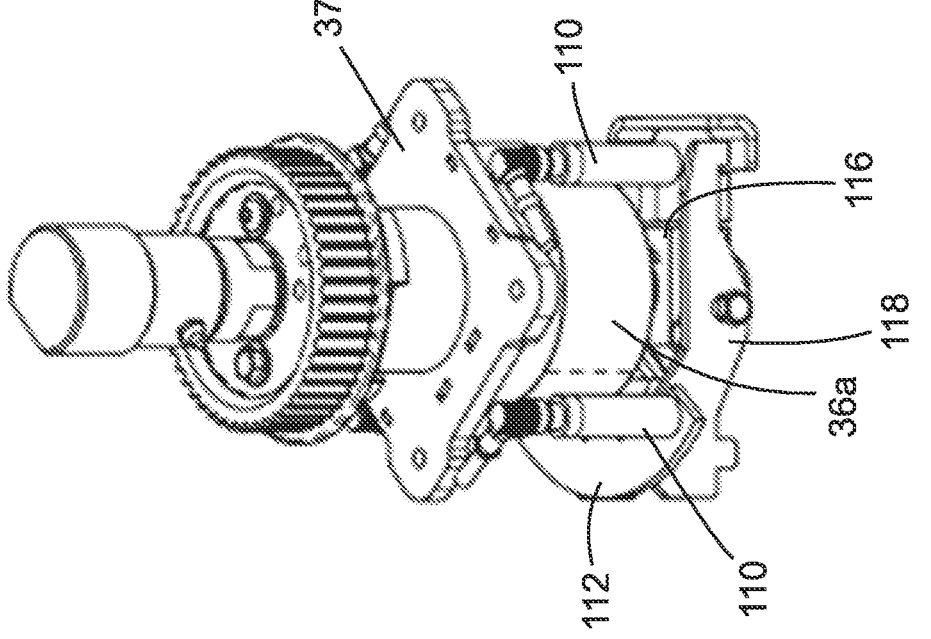

In one approach, the plurality or set of sensors 110 includes four sensors 110, each of which are arranged in a common horizontal plane and spaced radially away at a common radial distance relative to the axis of rotation of the treatment device 12 and shaft 32. The sensors 110 are spaced apart from each other equally in the circumferential direction (every 90 degrees in the case of four sensors) around the axis of rotation. The sensors 110 are fixedly mounted relative to the housing 30 and therefore move with the trolley 24, with the treatment device 12 being rotationally carried by the trolley 24 and shaft 32. The bottoms of the sensors 110 are each disposed below the bottom of the housing 30, thereby extending through the base of the housing 30. The tops of the sensors 110 are electrically connected to the main controller 20 either directly or through a relayed connection, such that the main controller 20 receives signals from each of the sensors 110. FIGS. 17A-B illustrate the sensors 110 disposed radially and circumferentially around the shaft 32, with the housing hidden for clarity. FIGS. 18A and 18B illustrate the sensors 110 relative to the support plate 37 that is mounted to the housing 30 and that supports the slip ring 36, described previously.

The sensors 110 are each configured to detect the presence or absence of a flag 112, shown in FIGS. 17A-17B, which moves rotationally below the sensors 110. Thus, for a given rotational position of the flag 112, the sensors 110 will each return a binary value of whether or not the flag 112 is detected below each of the sensors.

The flag 112 has a curved shape, in one aspect, having a radius generally corresponding to the radial distance of the sensors 110 from the axis of rotation of the treatment device 12. In one example, the sensors 110 are arranged on a 6 inch diameter and the flag 112 has about a 6 inch diameter. The flag 112 has a curved length that, in one approach, extends greater than 90 degrees around the circumference defined by the sensors 110, but less than 180 degrees. Accordingly, the flag 112 is long enough to provide a signal to two of the sensors 110, depending on its location, but not three, and the flag 112 is similarly long enough to always be below at least one of the sensors 110 during normal operation. Preferably, the flag 112 is just long enough such that when two of the sensors 110 detect the flag, the treatment device 12 is at one of four distinct locations. Put another way, the flag 112 is just long enough to reach two sensors, without a substantial amount of extension circumferentially beyond either of the sensors 110 that it reaches. The flag 112 may also have other shapes, including but not limited to a rectangular shape, with a length/size that activates either one or two sensors in a manner similar to the above. It will be appreciated that other numbers of sensors 110 may be provided, with a correspondingly different length for the flag 112.

The flag 112 is rotationally fixed relative to the rotational position of the shaft 32 and treatment device 12, and, thus, depending on which of the sensors 110 detect the flag 112, the controller 20 can determine the rotational orientation of the treatment device 12 within a directional window corresponding to the range in which the flag 112 could be present. The controller 20 can then determine the direction to rotate the treatment device 12 to return it to a known position or to resume rotation in the correct rotational direction. As the treatment device 12 is controlled to rotate, the sensors 110 may continue to provide a signal to the controller 20. Thus, once a two sensor state is detected, the controller 20 may then determine a more precise location of the treatment device 12, and can thereafter control the treatment device 12 based on this more precise known position. Thus, even if a single sensor 110 detects the flag 112, the controller 20 only needs to rotate the shaft a limited amount until the two-sensor state is detected.

FIG. 17A illustrates the flag 12 in a position to activate one sensor 110. FIG. 17B illustrates the flag 112 in a position to activate two of the sensors 110. FIG. 18A illustrates the flag in a similar position to FIG. 17B, and also shows the sensors 110 and flag 112 relative to the slip ring 36 and associated structure. The sensors 110 are shown disposed radially outward from the slip ring 36 and its structure, thereby providing space radially within for the slip ring 36 to occupy.

The flag 112 is supported on a portion of an arch support structure 114, which is arranged to cooperate with the sensors 110 via the flag 112 and to also provide impact detection.

Figure 18D:
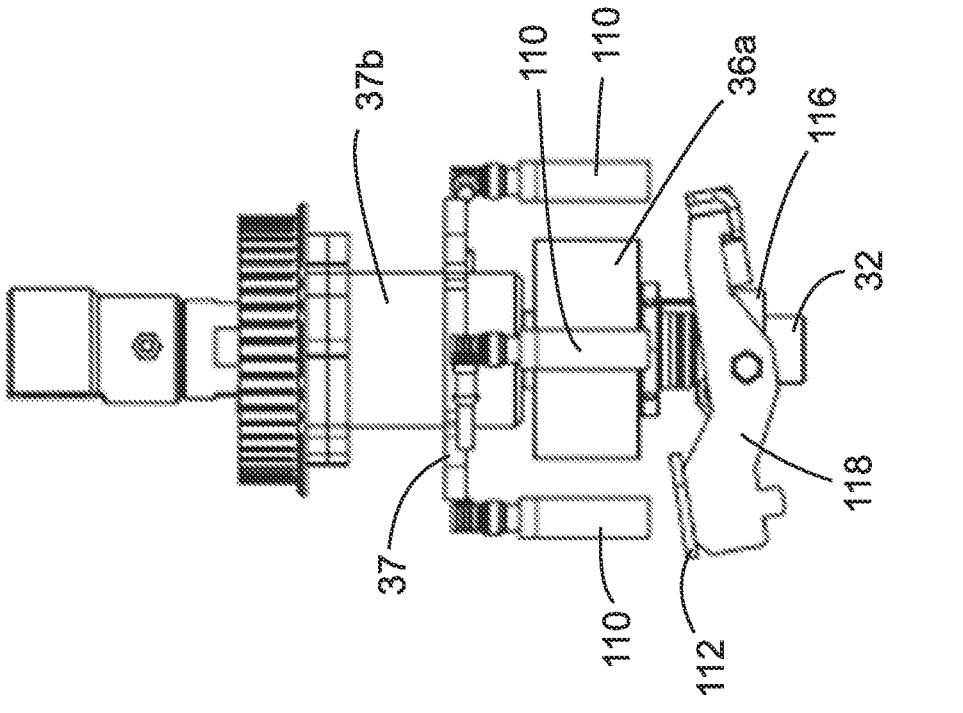
Figure 18C:
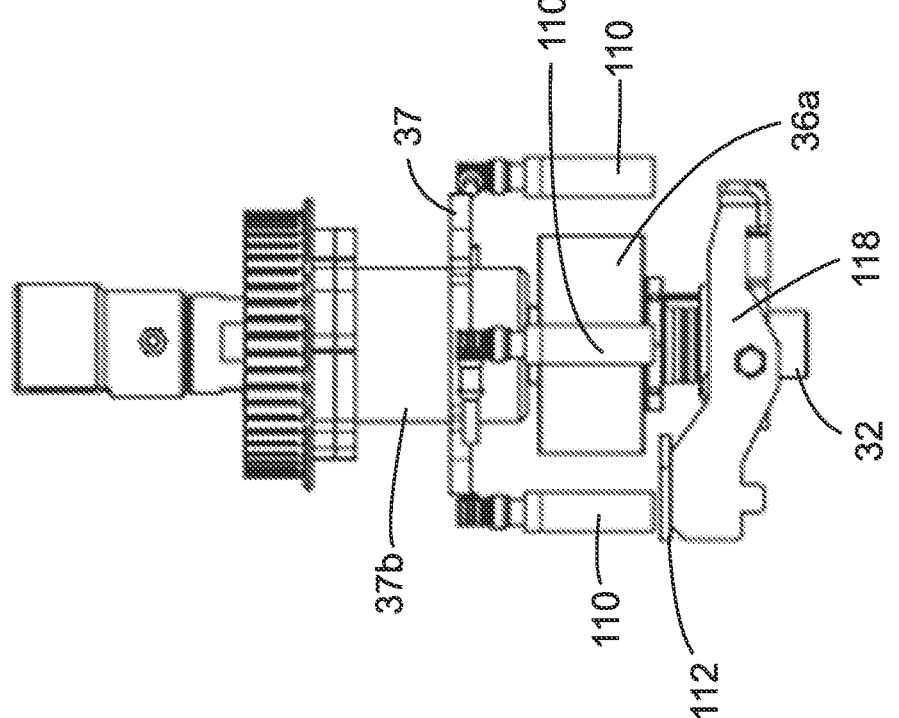
Figure 19B:
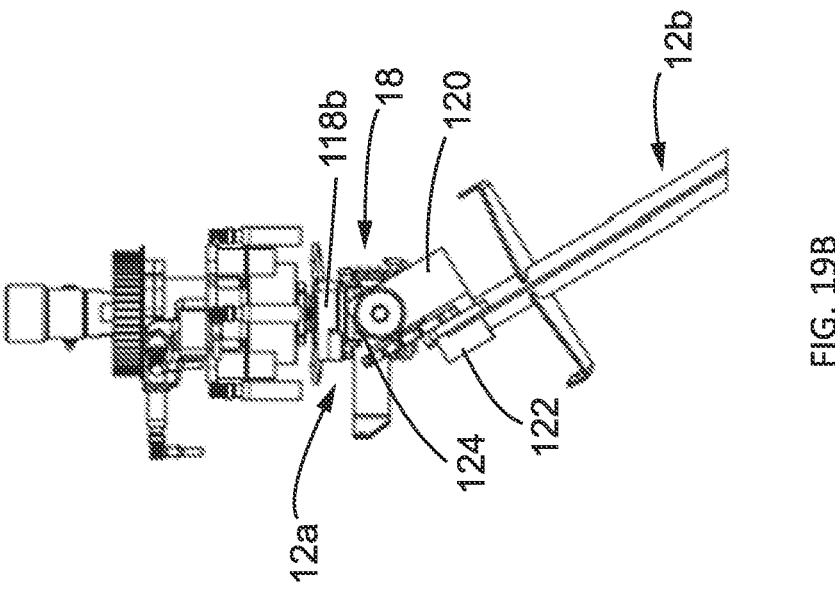
FIGS. 19A-19B illustrate the vehicle treatment device in an impact state, causing the flag to move to the impact state of FIG. 18D.
Figure 19A:
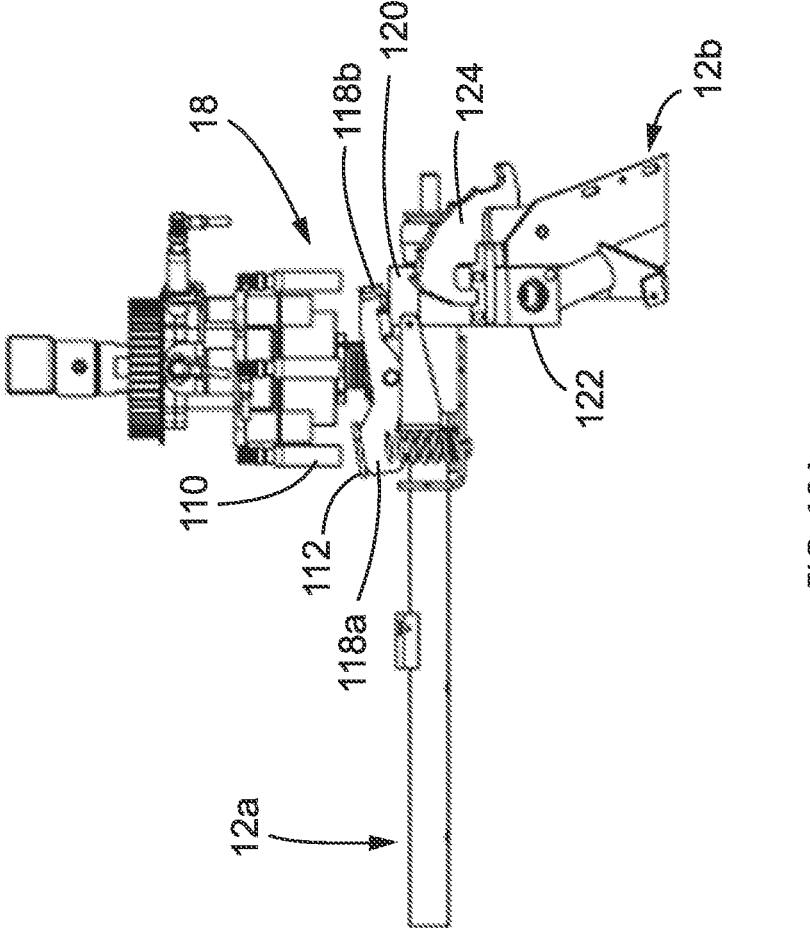

FIGS. 18C and 18D illustrate the support structure 114 in a normal (non-impact) state and an impact state, respectively. During the normal state shown in FIG. 18C, the flag 112 is shown at a predetermined distance below one of the sensors 110. The controller 20 detects this position as part of the orientation detection scheme.

During an impact state, shown in FIG. 18D, the support structure 114 is shown pivoted in response to the impact, such that the flag 112 is now positioned further away from the sensor 110. The flag 112 is designed to always activate at least one of the sensors 110, so when the flag 112 moves away from the sensor 110 and none of the sensors 110 are activated, the impact state will be detected by pivoting the flag 112 downward as a result of the impact. The detection states of the sensors 110 may be sent to the controller 20 during the treatment process, and therefore the controller 20 will detect when an expected sensor state fails to occur.

The support structure 114 is mounted to the rotating shaft 28 of the treatment system, with the treatment device 12, including both the upper portion 12a and side portion 12b, attached to the support structure 114 to rotate along with rotation of the shaft 28. The support structure 114 includes a base 116 attached to the bottom of the shaft 28. A bracket 118 is pivotably mounted to the base 116 via pins or the like, having a first side 118b (also referred to as impact side 118b, because this is the side that is contacted during an impact to pivot/move the bracket 118) and a second side 118a (also referred to as flag side 118a, because this is the side that has the flag 112 and which moves away from the sensors 110 when the bracket 118 pivots) opposite the flag side 118a. The bracket 118 is biased to its normal state. In one approach, a spring 112a (FIG. 19A) is provided below the flag 112 to bias the flag 112 upward. However, other approaches to returning the bracket 118 to its normal state when there is no impact can also be used, such as via a weight imbalance or other springs.

The side portion 12b of the treatment device 12 is designed such that it may pivot about two transverse axes relative to the upper portion 12a when there is an impact. It will be appreciated that reference to impact may include other changes in angle position of the treatment device 12 that is not expected, which may include other events or external forces, with vehicle impact being a common cause of such change in angle position or deviation from an expected position. The side portion 12b may include a shoulder portion 122 (also referred to as a first actuating portion) and a head portion 120 (also referred to as a second actuating portion) in the form of blocks or the like, shown in FIG. 19A-B, such that when the side portion 12b pivots about the lateral axis that runs parallel to the upper portion 12a (bottom of side portion 12b moves forward or rearward relative to the upper portion 12a), the top of the head portion 120 will contact the underside of the first side/impact side 118b of bracket 118, thereby causing the second side/flag 118b of bracket 118, thereby causing the second side/flag side 118a to pivot downward against its bias and away from the sensors 110. This type of impact may occur when a treatment device is moving along the rear of the vehicle and impact is made with a trailer hitch, or when a treatment device is moving along the side of the vehicle and impact is made with a side mirror. In this type of impact and pivoting of the side portion 12b, the angle enclosed by the side portion 12b and the upper portion 12a remains generally the same.

The side portion 12b is also configured to pivot laterally outward about a fore-and-aft axis perpendicular to the lateral axis and the longitudinal extent of the upper portion 12a. For this impact type, shoulder portion 122 is pivotable relative to head portion 120. This type of impact can occur when the treatment device is in front of the vehicle to treat the vehicle (with the direction of fluid disposed toward the vehicle), and the vehicle pulls forward, for example. Pivoting of the shoulder portion 122 relative to the head portion 120 moves the side portion 12b in a direction generally parallel to the fluids that are expelled from the side portion 12b. During non-impact (or when an external force is not being applied against the side portion 12b), and during a normal treatment process in which fluid is expelled, returns forces will result that urge the side portion 12b in this outward direction away from the vehicle. To counter the return forces, a shear pin may be disposed between the shoulder portion 122 and the head portion 120, such that the side portion 12b remains in position relative to the upper portion 12a when fluids are delivered. However, during impact or an external force (which are typically greater than the return force that occurs from providing the fluid), the shear pin may be severed, allowing the side portion 12b to pivot outward relative to the upper portion 12a. Thus, in response to this type of impact (bottom of the side portion 12b moves outward relative to the top portion 12a, changing the relative angle enclosed between them, as shown in FIG. 15), the shoulder portion 122 will pivot relative to the head portion 120, causing an actuator member 124 (shown in the form of a toothed fin) to move toward and contact the bottom of the impact side 118b of the bracket 118, thereby causing the flag 112 to pivot downward and away from the sensors 110. Because the shear pin has been severed, the toothed fin shape of the actuator member 124 may also engage the bottom of the bracket 118 to hold the side portion 12b in its pivoted state in this aspect, with the bottom of the bracket 118 holding the tooth of the actuator member 124 in its position and blocking its return, similar to a ratchet. It will be appreciated that other forms of the actuator member 124 that contacts and engages the bracket 118 to cause the movement of the flag 122 away from the sensors 110 may also be used, and that the use of the shear pin and toothed fin shape are one example of managing the normal position of the side portion 12b and the impacted position of the side portion 12b.

Thus, in either type of impact with the side portion 12b (fore-and-aft or lateral), the side portion 12b is permitted to pivot relative to the support structure 114, causing the bracket 118 to pivot to move the flag 112 away from the sensors 110. The particular arrangement of the structure shown and described herein is one example, but it will be appreciated that other variations and/or bracket shapes, or specific locations of pivot axes for the side portion 12b, could be used resulting in a similarly advantageous operation of lifting the bottom of the impact side of the bracket 118 to cause movement of the flag 112 away from the sensors 110.

The arrangement of the sensors 110 relative to the trolley housing 30, and the flag 112 relative to the treatment device 12, may be selected as desired by the user. As shown in the Figures, the sensors 110 and flag 112 are arranged such that when two sensors 110 detect the flag 112, the treatment device 12 is positioned approximately 45 degrees offset from the translation direction of the trolley 24 along the wash bridge 26.

The sensors 110 and flag 112 may be calibrated as desired for different sensitivity based on tolerances. For instance, the air gap between the flag 112 and the sensors 110 may be adjusted to signal an impact over different amounts of pivoting. Similarly, the sensitivity of the sensors 110 may be adjusted relative to a given air gap value.

Because the flag 112 is long enough to activate more than one sensor 110 at the same time, the impact state causing the flag 112 to move downwardly away from the sensors 110 causes none of the sensors to be activated, which is not a normal operative state, a.k.a. impact is detected. During rotation, the known arrangement of the sensors 110 results in the controller 20 expecting to receive a certain progression of corresponding sensor activation, which will indicate the good working condition of sensors and non-impact state of the treatment device 12. It will be appreciated that reference to "normal" operation is intended to indicate operation in which the system is operating without a substantial impact where correction is desired. But it will also be appreciated that the act of detecting an impact is part of the designed functionality, and in a sense part of an overall normal operation.

Thus, during an impact, whether by the vehicle, debris, a person in the wash bay, or anything else imparting a force against the treatment device 12, the expected sensor activation is interrupted by the pivoting of the flag 112 away from the sensors 110. For example, a trailer hitch extending beyond the rear of the vehicle may be in the path of the spray treatment device 12. The treatment device 12 may be traversing the rear of the vehicle without rotation, and the controller will therefore expect to detect the currently activated sensor 110 to remain activated. Upon impact with the trailer hitch, the side portion 12b will pivot relative to the support structure 114, causing the bracket 118 to lift up at the impact side 118b and the flag side 118a to move downward, moving the flag 112 away from the sensor 110. The controller 20 will detect that the previously activated sensor 110 is no longer activated by the flag 112, and the process can be paused.

In response, the controller 20 can determine, based on the operation that was occurring, the likely cause of the impact, and can adjust its control algorithm based on pre-programmed correction schemes, via additional sensor readings, or the like.

For instance, one corrective action is to reverse the movement that was just occurring. For instance, if the treatment device 12 was moving to the left along the rear of the vehicle, the treatment device 12 can be moved back to the right, and the controller 20 can evaluate whether the expected sensor 110 becomes active again. The controller 20 can then shift the treatment device 12 further away from the vehicle to avoid whatever obstacle may have caused the impact, and can attempt the procedure again.

As described above, the controller may be programmed such that it expects certain sensor activation based on the treatment process that is being performed and the movement of the treatment device 12 that is being commanded, in order to detect an impact or deviation from the expected sensor signals 110. A deviation of an expected sensor signal may also occur due to a sensor malfunction, and the controller may therefore also be used to troubleshoot a faulty sensor.

The expected movement and position of the treatment device 12 may be considered predetermined movement, and may include position, orientation, speed, etc. Indeed, the rate at which the sensors 110 activate can be expected for a specified speed, as well as an orientation at a particular stage of a predetermined treatment process. Thus, impact, sensor malfunction, rotational restriction, and/or the like can be considered a deviation from the expected predetermined movement of the treatment device 12.

The activation of the sensors 110 by the flag 112 accordingly provides the orientation of the treatment device 12 relative to an expected orientation during treatment, but the activation of the sensors 110 also provides an orientation of the treatment device in a standstill state, such as during a power up situation, during calibration, or after impact, to determine a relatively precise orientation and/or direction that the treatment device is pointing. For instance, in the illustrated embodiment, four sensors 110 are shown, with the flag 112 long enough to activate two of the sensors 110 at once in certain orientations, but short enough that only one sensor will activated in positioned between those four orientations. Thus, eight different orientations may be detected when the treatment device 12 is stationary. It will be appreciated that additional sensor arrangements may be selected to provide different static position detection, as desired, including the use of different spacing and/or quantities of sensors 110 and/or size and shape of the flag 112.

While the above orientation detection and impact detection mechanism having the described sensors 110 permits the use of the slip ring 36 as described herein, it will be appreciated that these advantages are not limited to instances in which a slip ring connection is used, just as the advantages of a multiplexed communication channel and sub-controllers disposed on the treatment device 12 itself can be provided with or without a slip ring 36. Thus, the orientation and impact detection mechanism described herein are usable in a variety of vehicle treatment processes and devices, including dual vertical arches on each side of a vehicle, rotatable brushes, and the like.

The above orientation detection and impact control could also be used on combination devices, such as rotatable brushes also including nozzles, such that the brush can be oriented specifically to align its nozzles in the desired direction.

It will be appreciated that the above example descriptions of the treatment device 12 includes reference to features that are likewise applicable to rotatable brushes and other vehicle treatment components, in particular with regarding to specific control via sub controllers of different components disposed along the treatment device.

The above described aspects of features of the present disclosure may be provided alone or in combination with other aspects and features disclosed herein and known in the art. It will be appreciated that the above described aspects and example embodiments are for the purposes of discussion and illustration, and are not limiting in that regard.

What is claimed is:

1. A vehicle treatment system for detecting a positional status of a vehicle treatment device, the system comprising:
   a rotatable vehicle treatment device supported for rotation by a support structure and having an axis of rotation;
   a bracket including a flag attached thereto, the bracket rotationally fixed relative to the vehicle treatment device, wherein the bracket and flag rotate with the vehicle treatment device;
   wherein the bracket and flag are pivotable about a pivot axis of the bracket aligned transverse to the axis of rotation of the vehicle treatment device in response to a deviation of the treatment device from an expected position; and a plurality of sensors fixed relative to the support structure, wherein the bracket, flag, and treatment device are rotatable relative to the plurality of sensors;

wherein the flag is detected by at least one sensor during predetermined movement of the vehicle treatment device;

wherein the flag moves relative to the sensors during a deviation from an expected angular position of the predetermined movement by the vehicle treatment device, such that a different number of sensors detect the flag relative to an expected number of sensors for the predetermined movement.

2. The vehicle treatment system of claim 1, wherein the vehicle treatment device is pivotable in response to an external force applied thereto;

wherein in response to the external force applied to the vehicle treatment device, the vehicle treatment device moves a first side of the bracket in a first direction and an opposite side moves in a second direction opposite the first direction about the pivot axis of the bracket.

3. The vehicle treatment system of claim 2, wherein the movement in the second direction of the opposite side of the bracket moves the flag away from the sensors.

4. The vehicle treatment system of claim 2, wherein the vehicle treatment device is pivotable via at least one pivot axis of the vehicle treatment device that rotates with the vehicle treatment device.

5. The vehicle treatment system of claim 4, wherein the vehicle treatment device is pivotable about the at least one pivot axis of the vehicle treatment device throughout a rotational travel of the vehicle treatment device about the axis of rotation.

6. The vehicle treatment system of claim 4, wherein the at least one pivot axis of the vehicle treatment device comprises a first pivot axis and a second pivot axis, wherein the first and second pivot axes are transverse to each other as well as the axis of rotation, wherein pivoting of the treatment device about the first axis moves the first side of the bracket in the first direction and pivoting of the treatment device about the second axis also moves the first side of the bracket in the first direction.

7. The vehicle treatment system of claim 4, wherein an actuator member is coupled to the vehicle treatment device, wherein the actuator member pivots into contact with the first side of the bracket and moves the first side in the first direction in response to pivoting of the vehicle treatment device about the first axis of the vehicle treatment device.

8. The vehicle treatment system of claim 7, wherein the actuator member is attached to a first actuating portion and extends from the first actuating portion, and the first actuating portion is pivotable relative to a second actuating portion, wherein the second actuating portion contacts the first side of the bracket when the vehicle treatment device pivots relative to the second pivot axis of the vehicle treatment device.

9. The vehicle treatment system of claim 8, wherein the vehicle treatment device pivots about the first axis in response to an external force applied in a direction of fluid emission from the treatment device, and the vehicle treatment device pivots about the second axis in response to an external force applied in a direction perpendicular to the direction of fluid emission.

10. The vehicle treatment system of claim 1, wherein the sensors are equally spaced circumferentially around the axis of rotation of the vehicle treatment device, wherein the flag has a length corresponding to a distance between adjacent sensors such that exactly one or two sensors are activatable by the flag simultaneously during normal operation depending on rotational position of the flag, such that an orientation of the vehicle treatment device is determinable based on which single sensor or pair of sensors detect the flag at a given time.

11. The vehicle treatment system of claim 10, wherein an orientation and rotational speed are detectable based on which of the sensors are activated at a given time during rotational movement of the vehicle treatment device, and wherein the orientation is also detectable based on which single sensor or pair of sensors are activated at a given time while the vehicle treatment device is rotationally stationary.

12. The vehicle treatment system of claim 1, wherein the sensors are proximity sensors, the flag is spaced from the sensors via an air gap during normal operation, and the sensors detect the presence of the flag within a predefined range from the sensors.

13. The vehicle treatment system of claim 1, wherein a slip ring is provided between the support structure and the vehicle treatment device, wherein the slip ring provides multiplexed communication and power between a main controller on a first side of the slip ring and a sub-controller on the opposite side of the slip ring, wherein the sub-controller activates a plurality of activatable components disposed on the vehicle treatment device in response to receiving a multiplexed signal from the main controller through the slip ring.

14. The vehicle treatment system of claim 13, wherein the main controller detects deviation of the vehicle treatment device in response to an external force on the vehicle treatment device, wherein the sub-controller activates a plurality of lights in response to a multiplexed communication signal from the main controller indicating a detected impact.

15. The vehicle treatment system of claim 1, wherein the bracket and the flag are disposed below the support structure, wherein lower ends of the sensors are disposed below the support structure and above the bracket and the flag.

16. The vehicle treatment system of claim 1, wherein the flag is biased toward the lower ends of the sensors, wherein the bracket and flag pivot against the bias in response to the deviation.

17. A method of detecting a positional status of a vehicle treatment device of a vehicle treatment system, the method comprising:

providing a rotatable vehicle treatment device, wherein the vehicle treatment device is rotatable relative to a support structure, wherein a bracket and flag rotate with the vehicle treatment device, and wherein a plurality of sensors are fixed relative to the support structure;

detecting the flag by at least one of the sensors;

providing an external force on the vehicle treatment device and pivoting the vehicle treatment device relative to at least one pivot axis of the vehicle treatment device;

contacting the bracket with the vehicle treatment device in response to pivoting the vehicle treatment device, and thereby pivoting the bracket about a pivot axis of the bracket;

moving the flag fixed to the bracket away from the sensors in response to pivoting the bracket about the pivot axis of the bracket; and detecting, by the sensors, that the flag has moved away from the sensors and detecting a deviation from a predetermined movement of the vehicle treatment device.

18. The method of claim 17, wherein at least one of the sensors detects the flag throughout an entire rotational travel of the vehicle treatment device prior to the deviation.

19. The method of claim 17, wherein the system detects the flag via the sensors according to the predetermined movement and an expected activation of each of the sensors, and detects rotational position based on which sensors detect the flag, and detects the deviation or an error state when different sensors are activated than expected based on the predetermined movement.

20. The method of claim 17, wherein the vehicle treatment device pivots about a first pivot axis and contacts the bracket with a first actuation portion of the vehicle treatment device, wherein the vehicle treatment device pivots about a second pivot axis and contacts the bracket with a second actuation portion of the vehicle treatment device.

21. A vehicle treatment system for detecting a positional status of a vehicle treatment device, the system comprising:
   a rotatable vehicle treatment device supported for rotation by a support structure and having an axis of rotation;

a flag that rotates with the vehicle treatment device; and
   a plurality of sensors fixed relative to the support structure, wherein the flag moves relative to the plurality of sensors and activates the sensors based on the rotational position of the flag relative to the sensors;
   wherein rotational speed, position, and orientation of the vehicle treatment device are determinable based on which sensors of the plurality of sensors are activated by the flag;
   wherein a deviation from a predetermined movement of the vehicle treatment device is detectable in response to an activation of sensors that deviates from an expected activation according to the predetermined movement of the vehicle treatment device.

22. The system of claim 21, wherein the flag is pivotable relative to the vehicle treatment device, and wherein the flag pivots away from the sensors during the deviation in response to external force applied to the vehicle treatment device.

23. The system of claim 21, wherein a rotational orientation of the vehicle treatment device is detectable based on which single sensor or pair of sensors is activated by the flag when the vehicle treatment device is rotationally stationary.

* * * * *